(12) United States Patent
Andrews et al.

(10) Patent No.: US 12,202,200 B2
(45) Date of Patent: Jan. 21, 2025

(54) CLEANING SYSTEMS FOR ADDITIVE MANUFACTURING APPARATUSES AND METHODS FOR USING THE SAME

(71) Applicant: General Electric Company, Schenectady, NY (US)

(72) Inventors: Timothy Francis Andrews, Sharonville, OH (US); Victor Fulton, Amelia, OH (US); Glen Charles Fedyk, Fairfield, OH (US); Carlos H. Bonilla, Lebanon, OH (US); Jacob Mayer, Cincinnati, OH (US); John Sterle, Clifton Park, NY (US); Vadim Bromberg, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/467,421

(22) Filed: Sep. 14, 2023

(65) Prior Publication Data

US 2024/0001616 A1 Jan. 4, 2024

Related U.S. Application Data

(62) Division of application No. 17/509,692, filed on Oct. 25, 2021, now Pat. No. 11,794,410.

(60) Provisional application No. 63/107,163, filed on Oct. 29, 2020.

(51) Int. Cl.
*B29C 64/35* (2017.01)
*B08B 1/16* (2024.01)
*B08B 1/32* (2024.01)
*B08B 1/50* (2024.01)
*B33Y 40/00* (2020.01)

(52) U.S. Cl.
CPC .............. *B29C 64/35* (2017.08); *B08B 1/165* (2024.01); *B08B 1/32* (2024.01); *B08B 1/50* (2024.01); *B33Y 40/00* (2014.12)

(58) Field of Classification Search
None
See application file for complete search history.

(56) References Cited

U.S. PATENT DOCUMENTS

| 4,701,972 | A | 10/1987 | Saito |
| 2009/0179947 | A1 | 7/2009 | Hibbard et al. |
| 2018/0007182 | A1 | 1/2018 | Lin |
| 2019/0126554 | A1 | 5/2019 | Iwase |

FOREIGN PATENT DOCUMENTS

EP 0913262 A1 5/1999

OTHER PUBLICATIONS

Extended European Search Report for EP Application No. 21201235.5 dated Apr. 8, 2022 (5 pages).

*Primary Examiner* — Rita P Adhlakha
(74) *Attorney, Agent, or Firm* — Dinsmore & Shohl LLP

(57) ABSTRACT

Embodiments of the present disclosure are directed to additive manufacturing apparatuses, cleaning stations incorporated therein, and methods of cleaning using the cleaning stations.

15 Claims, 20 Drawing Sheets

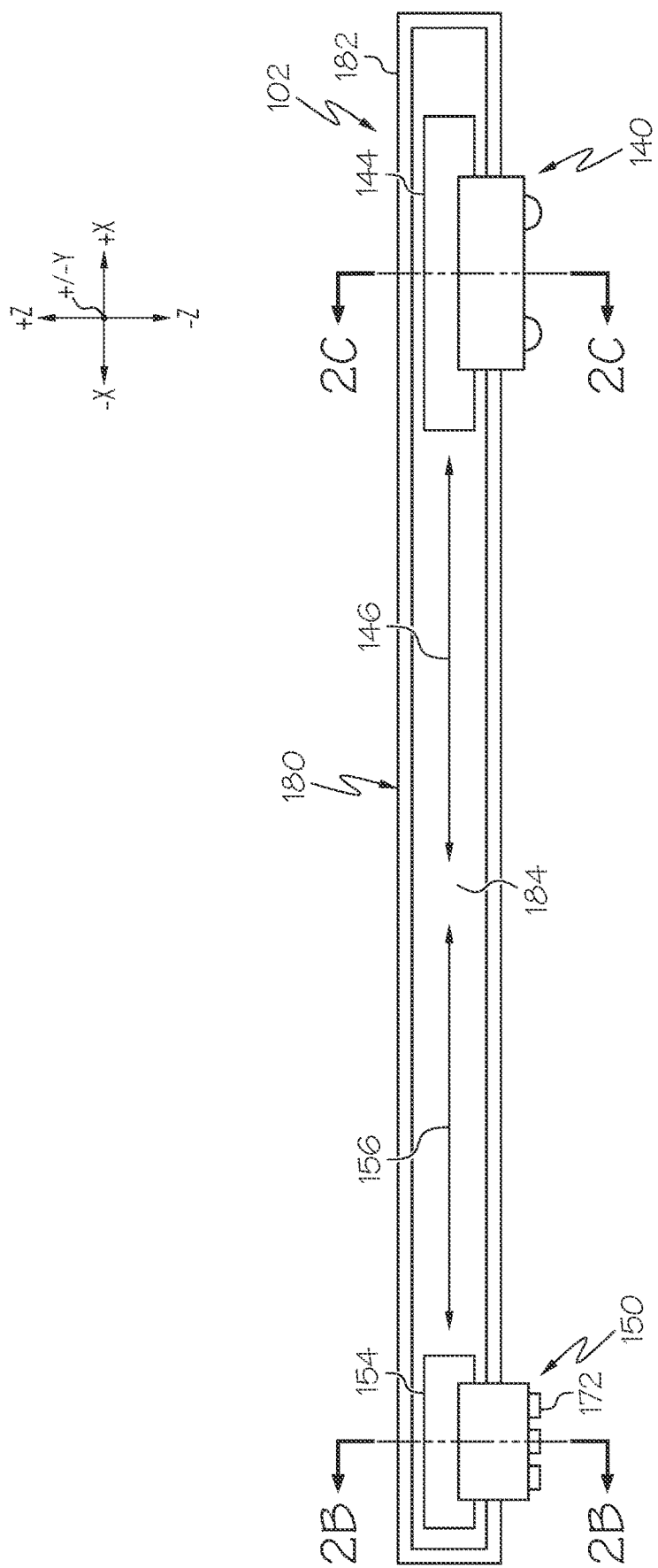

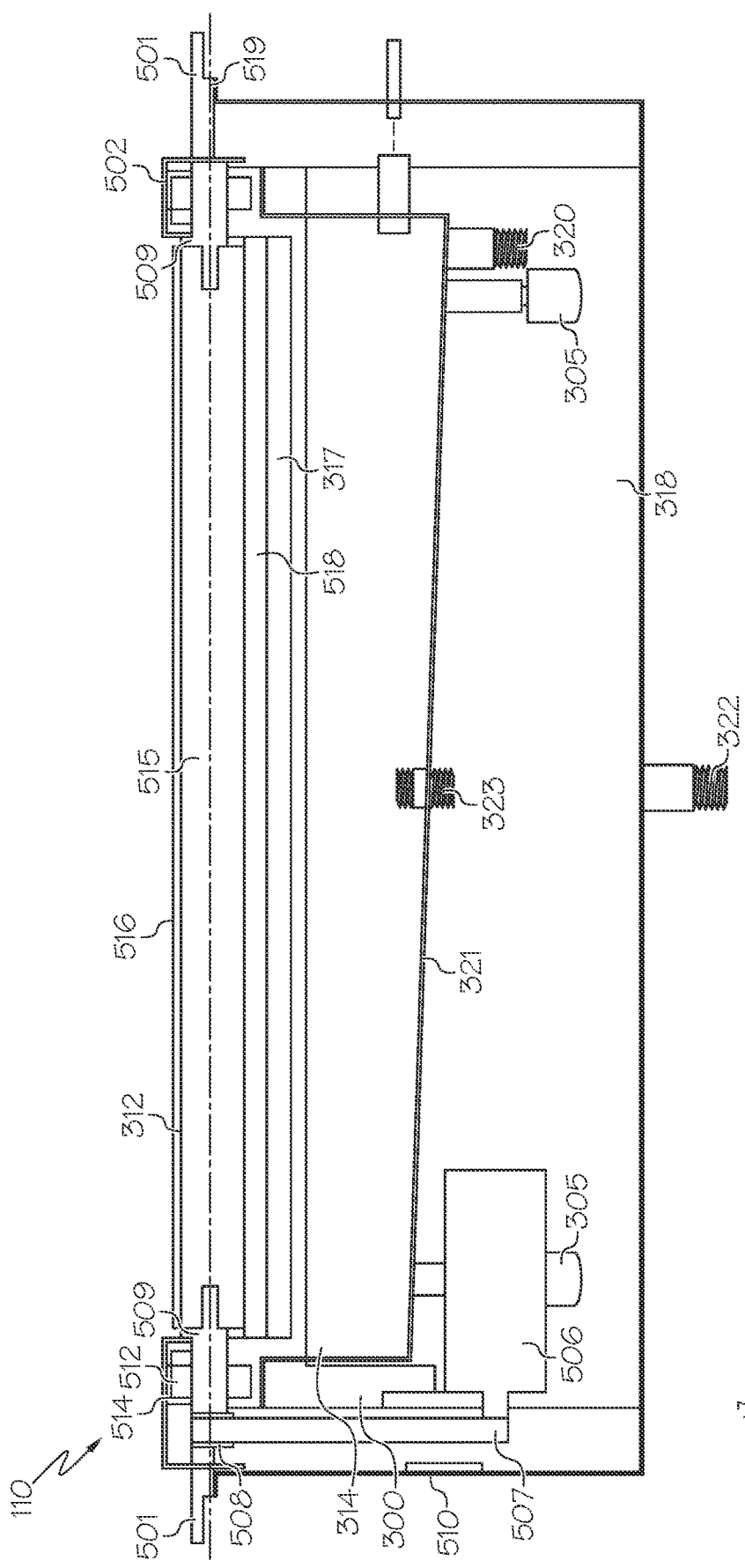
FIG. 4D
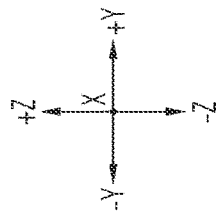

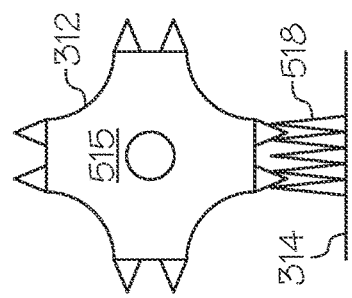
FIG. 6D
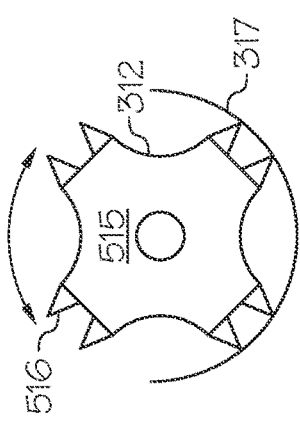
FIG. 6C
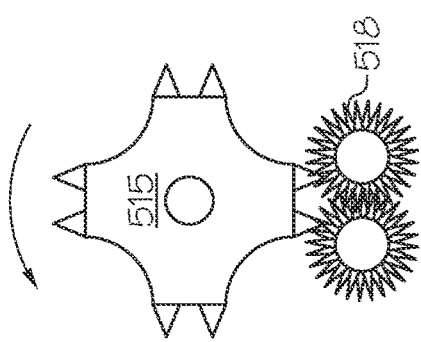
FIG. 6B
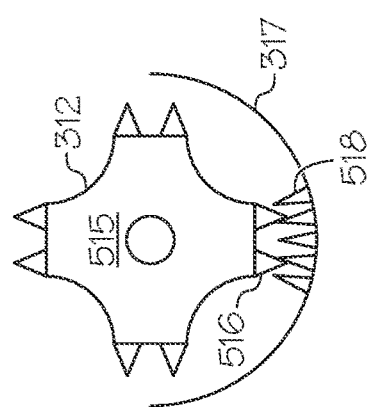
FIG. 6A
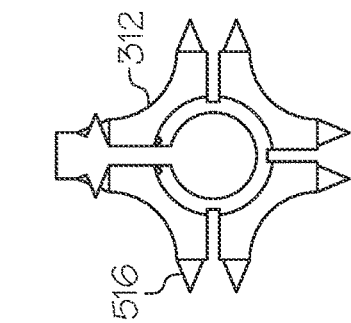
FIG. 6H
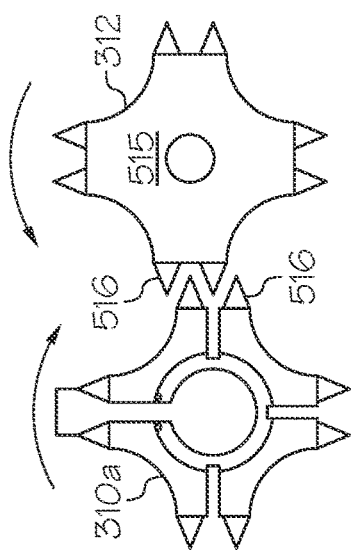
FIG. 6G
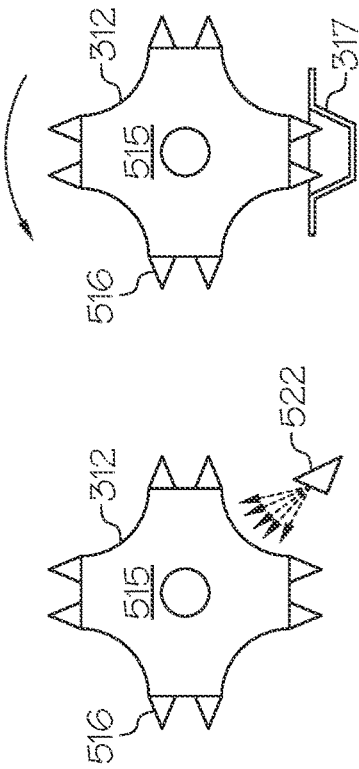
FIG. 6F
FIG. 6E

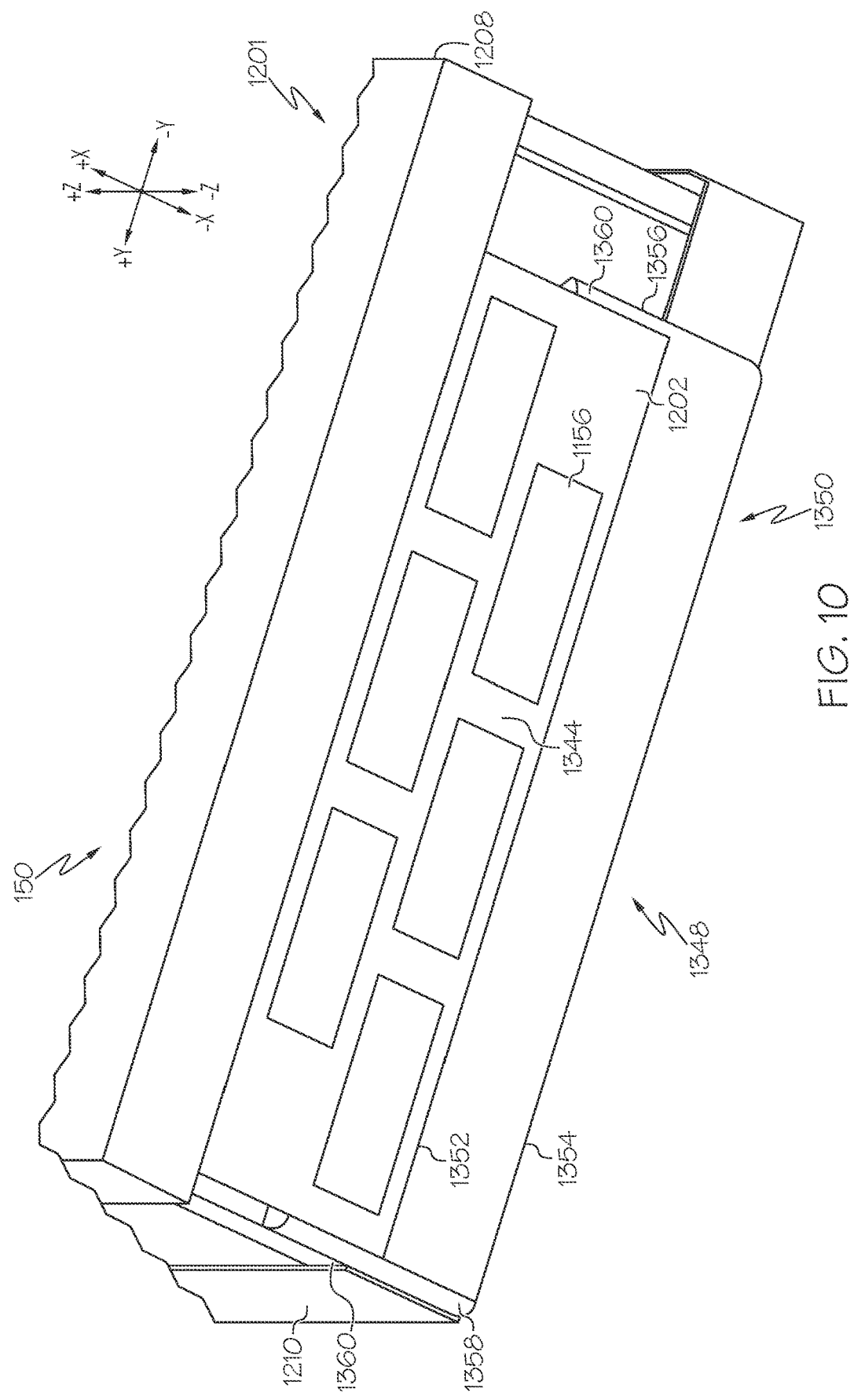

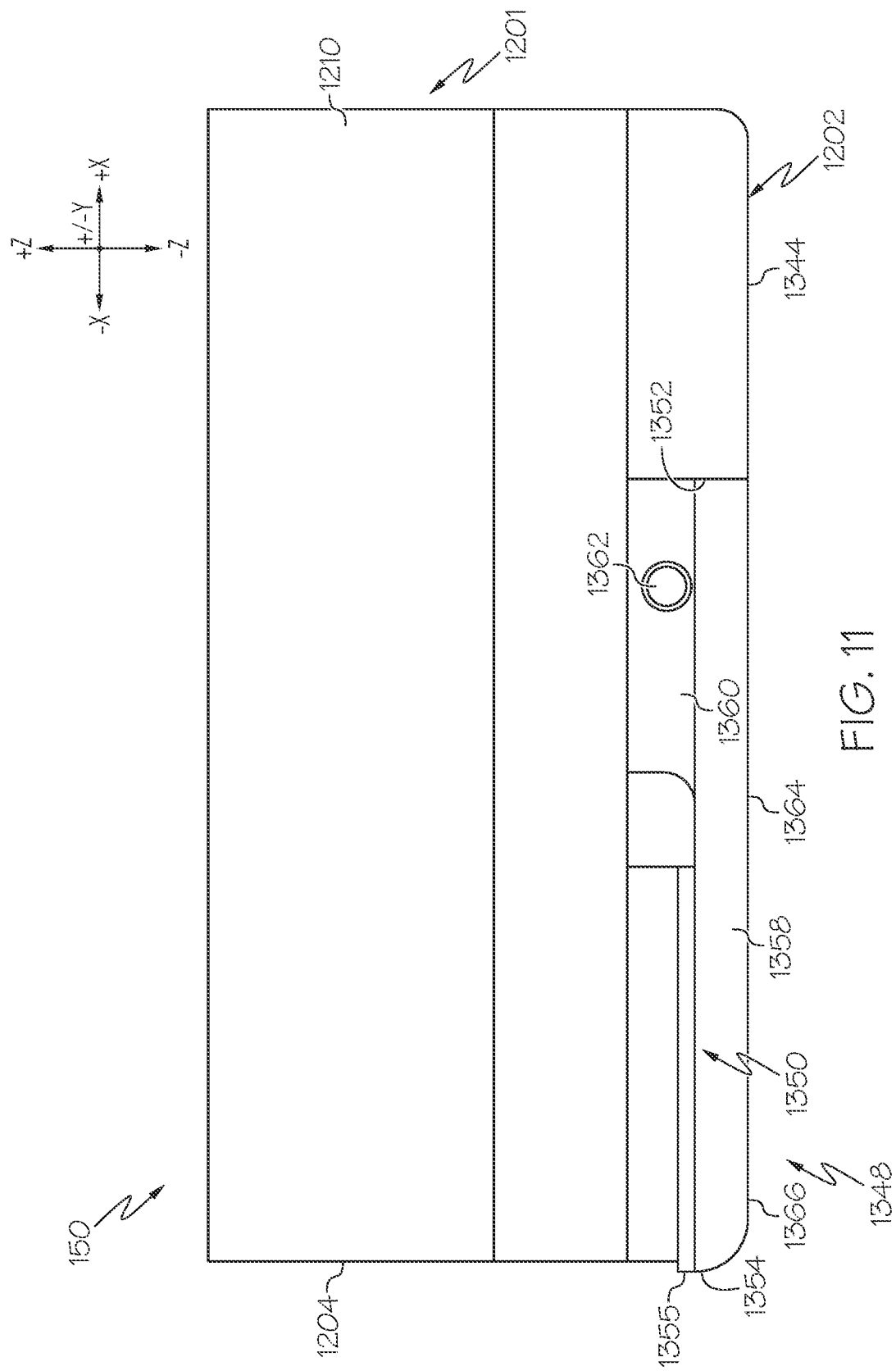

CLEANING SYSTEMS FOR ADDITIVE MANUFACTURING APPARATUSES AND METHODS FOR USING THE SAME

CROSS-REFERENCE TO RELATED APPLICATION

This application claims priority as a divisional to U.S. Non-Provisional patent application Ser. No. 17/509,692, filed Oct. 25, 2023, which claims priority to U.S. Provisional Patent Application No. 63/107,163, filed Oct. 29, 2020, for "Cleaning Systems For Additive Manufacturing Apparatuses And Methods For Using The Same," which is hereby incorporated by reference in its entirety including the drawings.

TECHNICAL BACKGROUND

The present specification generally relates to additive manufacturing apparatuses and, more specifically, to cleaning systems for additive manufacturing apparatuses and methods for using the same.

Additive manufacturing apparatuses may be utilized to "build" an object from build material, such as organic or inorganic powders, in a layer-wise manner. Early iterations of additive manufacturing apparatuses were used for prototyping three-dimensional (3D) parts. However, as additive manufacturing technology has improved, there is an increased interest in utilizing additive manufacturing apparatuses for large-scale commercial production of parts. One issue of scaling additive manufacturing apparatuses to commercial production is improving the through-put of additive manufacturing apparatuses to meet commercial demands.

Accordingly, a need exists for alternative additive manufacturing apparatuses and components thereof which improve manufacturing through-put.

SUMMARY

In a first aspect A1, a cleaning station comprises: a first wipe member rotatable about a first rotational axis comprising one or more wiper blades; a first wipe reservoir containing a volume of cleaning fluid therein, the first wipe reservoir located adjacent to the first wipe member such that as the first wipe member is rotated about the first rotational axis, the one or more wiper blades are rotated into and out of the volume of cleaning fluid in the first wipe reservoir; a second wipe member rotatable about a second rotational axis parallel to the first rotational axis, the second wipe member comprising one or more wiper blades; a second wipe reservoir containing a volume of cleaning fluid therein, the second wipe reservoir located adjacent to the second wipe member such that as the second wipe member is rotated about the second rotational axis, the one or more wiper blades are rotated into and out of the volume of cleaning fluid in the second wipe reservoir; and a wet cleaning member comprising a fluid channel containing a volume of cleaning fluid therein, wherein the wet cleaning member is positioned between the first wipe member and the second wipe member along a longitudinal axis extending substantially perpendicular to the first rotatable axis and the second rotatable axis.

In a second aspect A2, a cleaning station comprises the cleaning station of aspect A1, further comprising a spit capture tray containing a volume of cleaning fluid therein.

In a third aspect A3, a cleaning station comprises the cleaning station of aspect A2, wherein the spit capture tray comprises a first side wall and a second side wall, and wherein a height of the first side wall is less than an height of the second side wall.

In a fourth aspect A4, a cleaning station comprises the cleaning station of any of aspects A1-A3, further comprising a cover operable to create or maintain a non-curing environment around a print head.

In a fifth aspect A5, a cleaning station comprises the cleaning station of any of aspects A1-A4, further comprising: a cleaning station vessel positioned below the first wipe member, the second wipe member, and the wet cleaning member to receive cleaning fluid therefrom.

In a sixth aspect A6, a cleaning station comprises the cleaning station of aspect A5, wherein the cleaning station vessel comprises a bottom surface that is angled with respect to a horizontal plane and with respect to a vertical plane.

In a seventh aspect A7, a cleaning station comprises the cleaning station of any of aspects A5-A6, the cleaning station vessel comprising a main cleaning vessel drain positioned at a lowest vertical point of the cleaning station vessel.

In an eighth aspect A8, a cleaning station comprises the cleaning station of any of aspects A5-A7, further comprising an overflow vessel at least partially surrounding the cleaning station vessel.

In a ninth aspect A9, a cleaning station comprises the cleaning station of any of aspects A1-A8, wherein at least one of the first wipe reservoir and the second wipe reservoir comprise a brush or a wiper blade positioned therein to mechanically clean the corresponding first or second wipe member.

In a tenth aspect A10, a cleaning station comprises the cleaning station of any of aspects A1-A9, further comprising: a first motor coupled to the first wipe member to cause the first wipe member to rotate about the first rotational axis; and a second motor coupled to the second wipe member to cause the second wipe member to rotate about the second rotational axis.

In an eleventh aspect A11, a cleaning station comprises the cleaning station of any of aspects A1-A9, further comprising: a motor coupled to the first wipe member and the second wipe member to cause the first wipe member to rotate about the first rotational axis and to cause the second wipe member to rotate about the second rotational axis.

In a twelfth aspect A12, a cleaning station comprises the cleaning station of any of aspects A1-A11, wherein the wet cleaning member is stationary with respect to the first wipe member and the second wipe member.

In a thirteenth aspect A13, a cleaning station comprises the cleaning station of any of aspects A1-A12, further comprising a purge bin, wherein the first wipe member rotates in a direction effective to direct material from the one or more wiper blades of the first wipe member into the purge bin.

In a fourteenth aspect A14, a cleaning station comprises the cleaning station of aspect A13, further comprising a wiper blade cleaning member between the purge bin and the first wipe reservoir.

In a fifteenth aspect A15, a method of cleaning a print head comprises: rotating a first wipe member and a second wipe member into a contact position in which one or more wiper blades extends upwards vertically from each of the first wipe member and the second wipe member; flowing cleaning fluid to a cleaning member positioned between the first wipe member and the second wipe member; passing the print head over the first wipe member, thereby enabling the first wipe member to remove contaminants from the print head; passing the print head over the cleaning member and the second wipe member, thereby enabling the second wipe member to remove cleaning fluid from the print head; and rotating the first wipe member and the second wipe member into non-contact position in which one or more wiper blades are not extending from the first wipe member or the second wipe member in a substantially vertical direction.

In a sixteenth aspect A16, a method comprises the method of aspect A15, further comprising: applying backpressure to the print head prior to passing the print head over the first wipe member.

In a seventeenth aspect A17, a method comprises the method of any of aspects A15-A16, further comprising: passing the print head over a spit capture tray adjacent to the second cleaning member; and applying backpressure to the print head during passing of the print head over spit capture tray, thereby equilibrating the print head for printing.

In an eighteenth aspect A18, a method comprises the method of any of aspects A15-A17, further comprising: providing a flow of cleaning fluid to the spit capture tray.

In a nineteenth aspect A19, a method comprises the method of any of aspects A15-A18, further comprising: rotating the first wipe member and the second wipe member to contact the one or more wiper blades with cleaning fluid contained in a wipe reservoir positioned below the first wipe member and the second wipe member.

In a twentieth aspect A20, a method comprises the method of aspect A19, further comprising: collecting cleaning fluid from the wipe reservoir and the cleaning member in a cleaning station vessel.

In a twenty-first aspect A21, a method comprises the method of aspect A20, further comprising: continuously removing the cleaning fluid from the cleaning station vessel.

In a twenty-second aspect A22, a method comprises the method of any of aspects A15-A21, wherein the print head comprises a deflector plate that maintains contact between the print head and the one or more wiper blades of the second wipe member.

Additional features and advantages of the additive manufacturing apparatuses described herein, and the components thereof, will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 2A schematically depicts an embodiment of an actuator assembly for an additive manufacturing apparatus according to one or more embodiments shown and described herein;

FIG. 4D is a front cross-sectional view of the cleaning station of FIG. 4A;

FIG. 6A schematically depicts an example embodiment for cleaning a wipe member using wiper blades fixed within a wipe reservoir according to one or more embodiments shown and described herein;

FIG. 6B schematically depicts an example embodiment for cleaning a wipe member using rotating brushes according to one or more embodiments shown and described herein;

FIG. 6C schematically depicts an example embodiment for cleaning a wipe member using a wipe reservoir according to one or more embodiments shown and described herein;

FIG. 6D schematically depicts an example embodiment for cleaning a wipe member using a fixed brush according to one or more embodiments shown and described herein;

FIG. 6E schematically depicts an example embodiment for cleaning a wipe member using a sprayer according to one or more embodiments shown and described herein;

FIG. 6F schematically depicts an example embodiment for cleaning a wipe member using a wipe reservoir containing cleaning fluid according to one or more embodiments shown and described herein;

FIG. 6G schematically depicts an example embodiment for cleaning a wipe member using an adjacent rotating cleaning member according to one or more embodiments shown and described herein;

FIG. 6H schematically depicts an example embodiment for cleaning a wipe member using motion of the wipe member according to one or more embodiments shown and described herein;

FIG. 10 schematically depicts a bottom perspective view of a print head including a deflector plate according to one or more embodiments shown and described herein; and FIG. 11 schematically depicts an end view of the deflector plate on the print head according to one or more embodiments shown and described herein.

DETAILED DESCRIPTION

Figure 1:
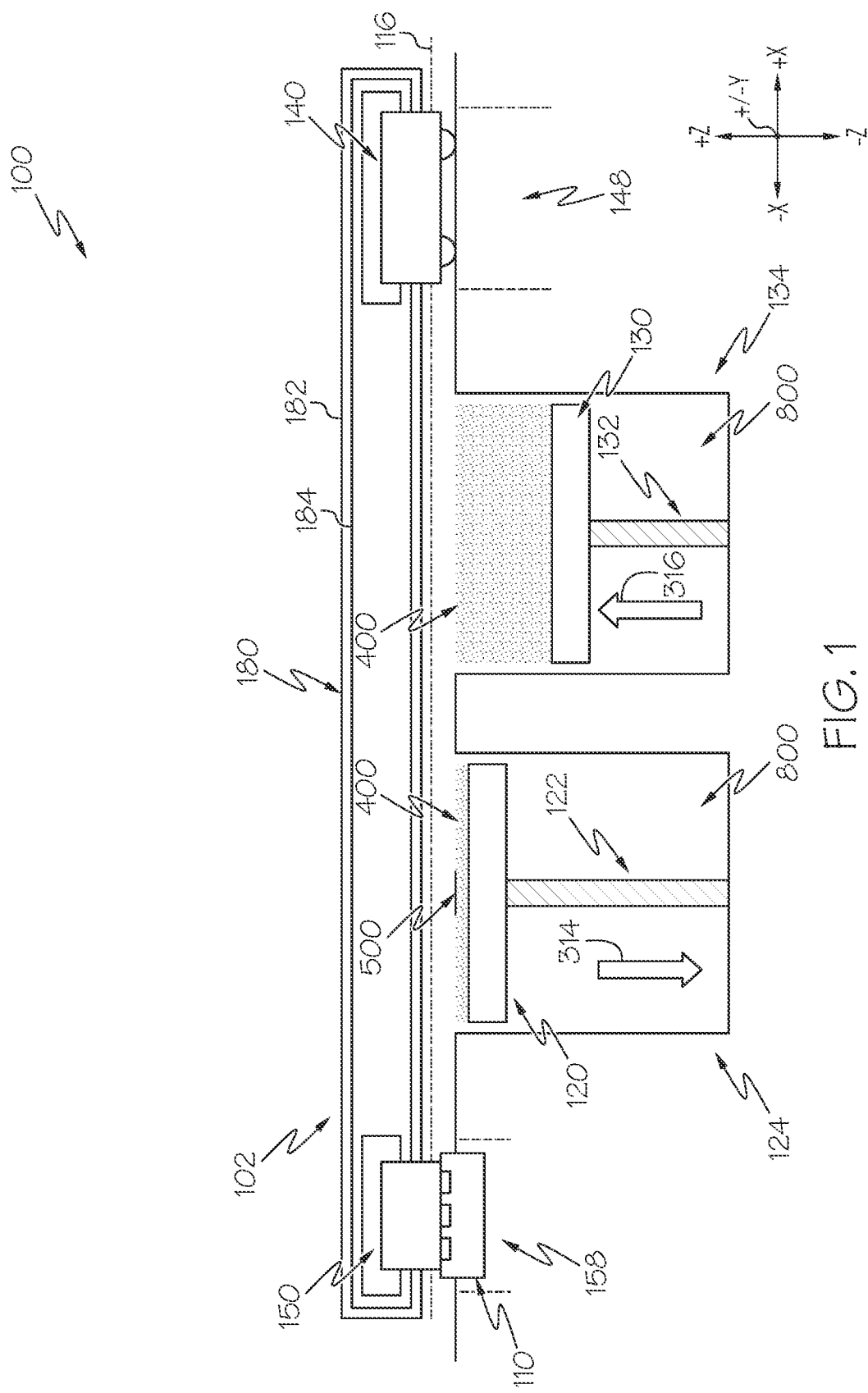
FIG. 1 schematically depicts components of an additive manufacturing apparatus according to one or more embodiments shown and described herein.

Reference will now be made in detail to embodiments of additive manufacturing apparatuses, and components thereof, examples of which are illustrated in the accompanying drawings. Whenever possible, the same reference numerals will be used throughout the drawings to refer to the same or like parts. One embodiment of an additive manufacturing apparatus 100 comprising a cleaning station 110 is schematically depicted in FIG. 1. The cleaning station 110 may generally include a wet wipe cleaner section and a dry wipe cleaner section. The cleaning station is in fluid communication with a cleaning fluid reservoir and applies cleaning fluid to a print head to clean the print head. Various embodiments of cleaning stations for additive manufacturing apparatuses, additive manufacturing apparatus comprising the cleaning stations, and methods for using the same are described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation unless otherwise expressly stated.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

During operation of an additive manufacturing apparatus, the efficacy and performance of the print head is essential. The print head is exposed to heat, and is also subject to excess build material distributed by a recoat head and/or binder material from the print head. The combination of these contaminants (i.e., excess build material and binder material) can lead to clogged nozzles in the print head, which can adversely impact operation of the additive manufacturing apparatus.

The embodiments described herein are directed to additive manufacturing apparatuses and components for additive manufacturing apparatuses, specifically cleaning systems in additive manufacturing apparatuses, which may be used to conduct automated routine maintenance of the additive manufacturing apparatuses to reduce or eliminate the presence of clogged nozzles in the print head and other contamination.

Additive Manufacturing Apparatus

Referring now to FIG. 1, an embodiment of an additive manufacturing apparatus 100 is schematically depicted. The apparatus 100 includes a cleaning station 110, a build platform 120, and an actuator assembly 102. The apparatus 100 may optionally include a supply platform 130. The actuator assembly 102 comprises, among other elements, a recoat head 140 for distributing build material 400 and a print head 150 for depositing binder material 500. In embodiments, the recoat head 140 may further comprise an energy source for curing the binder material 500 as will be described in further detail herein. The actuator assembly 102 may be constructed to facilitate independent control of the recoat head 140 and the print head 150 along the working axis 116 of the apparatus 100. This allows for the recoat head 140 and the print head 150 to traverse the working axis 116 of the apparatus 100 in the same direction and/or in opposite directions and for the recoat head 140 and the print head 150 to traverse the working axis of the apparatus 100 at different speeds and/or the same speed. Independent actuation and control of the recoat head 140 and the print head 150, in turn, allows for at least some steps of the additive manufacturing process to be performed simultaneously thereby reducing the overall cycle time of the additive manufacturing process to less than the sum of the cycle time for each individual step. In the embodiments of the apparatus 100 described herein, the working axis 116 of the apparatus 100 is parallel to the +/−X axis of the coordinate axes depicted in the figures. It should be understood that the components of the additive manufacturing apparatus 100 traversing the working axis 116, such as the recoat head 140, the print head 150, or the like, need not be centered on the working axis 116. However, in the embodiments described herein, at least two of the components of the additive manufacturing apparatus 100 are arranged with respect to the working axis 116 such that, as the components traverse the working axis, the components could occupy the same or an overlapping volume along the working axis if not properly controlled.

In the embodiment depicted in FIG. 1, the apparatus 100 includes a cleaning station 110, a build platform 120, a supply platform 130 and an actuator assembly 102. However, it should be understood that, in other embodiments, the apparatus 100 does not include a supply platform 130, such as in embodiments where build material is supplied to the build platform 120 with, for example and without limitation, a build material hopper. In the embodiment depicted in FIG. 1, the cleaning station 110, the build platform 120, and the supply platform 130 are positioned in series along the working axis 116 of the apparatus 100 between a print home position 158 of the print head 150 located proximate an end of the working axis 116 in the −X direction, and a recoat home position 148 of the recoat head 140 located proximate an end of the working axis 116 in the +X direction. That is, the print home position 158 and the recoat home position 148 are spaced apart from one another in a horizontal direction that is parallel to the +/−X axis of the coordinate axes depicted in the figures and the cleaning station 110, the build platform 120, and the supply platform 130 are positioned therebetween. In the embodiments described herein, the build platform 120 is positioned between the cleaning station 110 and the supply platform 130 along the working axis 116 of the apparatus 100.

The cleaning station 110 is positioned proximate one end of the working axis 116 of the apparatus 100 and is co-located with the print home position 158 where the print head 150 is located or "parked" before and after depositing binder material 500 on a layer of build material 400 positioned on the build platform 120. The cleaning station 110 may include one or more cleaning sections (not shown) to facilitate cleaning the print head 150 between depositing operations. The cleaning sections may include, for example and without limitation, a soaking station containing a cleaning solution for dissolving excess binder material on the print head 150, a wiping station for removing excess cleaning fluid from the print head 150, a jetting station for reestablishing a meniscus within the nozzles of the print head 150, a park station for maintaining moisture in the nozzles of the print head 150, or various combinations thereof. The print head 150 may be transitioned between the cleaning sections by the actuator assembly 102.

The build platform 120 is coupled to a lift system 800 comprising a build platform actuator 122 to facilitate raising and lowering the build platform 120 relative to the working axis 116 of the apparatus 100 in a vertical direction (i.e., a direction parallel to the +/−Z directions of the coordinate axes depicted in the figures). The build platform actuator 122 may be, for example and without limitation, a mechanical actuator, an electro-mechanical actuator, a pneumatic actuator, a hydraulic actuator, or any other actuator suitable for imparting linear motion to the build platform 120 in a vertical direction. Suitable actuators may include, without limitation, a worm drive actuator, a ball screw actuator, a pneumatic piston, a hydraulic piston, an electro-mechanical linear actuator, or the like. The build platform 120 and build platform actuator 122 are positioned in a build receptacle 124 located below the working axis 116 (i.e., in the −Z direction of the coordinate axes depicted in the figures) of the apparatus 100. During operation of the apparatus 100, the build platform 120 is retracted into the build receptacle 124 by action of the build platform actuator 122 after each layer of binder material 500 is deposited on the build material 400 located on build platform 120.

The supply platform 130 is coupled to a lift system 800 comprising a supply platform actuator 132 to facilitate raising and lowering the supply platform 130 relative to the working axis 116 of the apparatus 100 in a vertical direction (i.e., a direction parallel to the +/−Z directions of the coordinate axes depicted in the figures). The supply platform actuator 132 may be, for example and without limitation, a mechanical actuator, an electro-mechanical actuator, a pneumatic actuator, a hydraulic actuator, or any other actuator suitable for imparting linear motion to the supply platform 130 in a vertical direction. Suitable actuators may include, without limitation, a worm drive actuator, a ball screw actuator, a pneumatic piston, a hydraulic piston, an electro-mechanical linear actuator, or the like. The supply platform 130 and supply platform actuator 132 are positioned in a supply receptacle 134 located below the working axis 116 (i.e., in the −Z direction of the coordinate axes depicted in the figures) of the apparatus 100. During operation of the apparatus 100, the supply platform 130 is raised relative to the supply receptacle 134 and towards the working axis 116 of the apparatus 100 by action of the supply platform actuator 132 after a layer of build material 400 is distributed from the supply platform 130 to the build platform 120, as will be described in further detail herein.

Referring now to FIGS. 1 and 2A, FIG. 2A schematically depicts the actuator assembly 102 of the additive manufacturing apparatus 100 of FIG. 1. The actuator assembly 102 generally comprises the recoat head 140, the print head 150, a recoat head actuator 144, a print head actuator 154, and a support 182. In the embodiments described herein, the support 182 extends in a horizontal direction (i.e., a direction parallel to the +/−X direction of the coordinate axes depicted in the figures) parallel to the working axis 116 (FIG. 1) of the apparatus 100. When the actuator assembly 102 is assembled over the cleaning station 110, the build platform 120, and the supply platform 130 as depicted in FIG. 1, the support 182 extends in a horizontal direction from at least the cleaning station 110 to beyond the supply platform 130.

In one embodiment, the support 182 is a side of a rail 180 that extends in a horizontal direction. For example, in one embodiment, the rail 180 may be rectangular or square in vertical cross section (i.e., a cross section in the Y-Z plane of the coordinate axes depicted in the figures) with a side surface of the rectangle or square forming the support 182. However, it should be understood that other embodiments are contemplated and possible. For example and without limitation, the rail 180 may have other cross sectional shapes, such as octagonal or the like, with the support 182 being one surface of facet of the rail 180. In embodiments, the support 182 is positioned in a vertical plane (e.g., a plane parallel to the X-Z plane of the coordinate axes depicted in the figures). However, it should be understood that, in other embodiments, the support 182 is positioned in a plane other than a vertical plane.

In the embodiments described herein, the recoat head actuator 144 and the print head actuator 154 are coupled to the support 182.

Figure 2B:
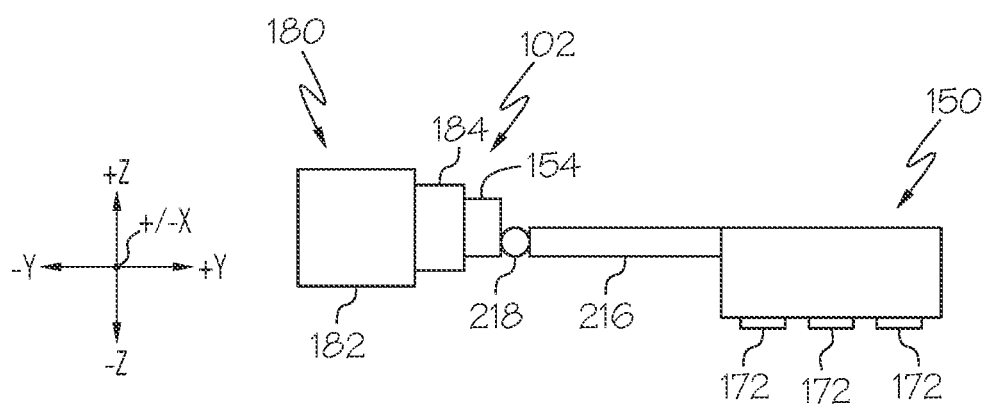
FIG. 2B schematically depicts a cross section of the actuator assembly of FIG. 2A.
Figure 2C:
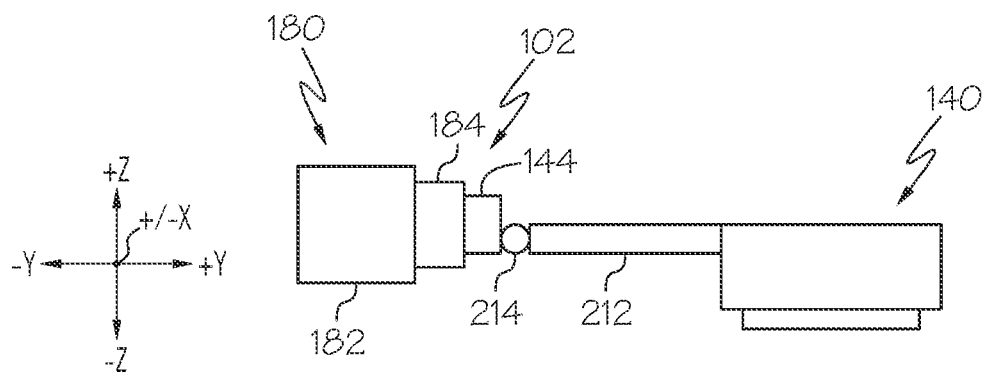
FIG. 2C schematically depicts a cross section of the actuator assembly of FIG. 2A.

In the embodiments described herein, the recoat head actuator 144 is bi-directionally actuatable along a recoat motion axis 146 and the print head actuator 154 is bi-directionally actuatable along a print motion axis 156. That is, the recoat motion axis 146 and the print motion axis 156 define the axes along which the recoat head actuator 144 and the print head actuator 154 are actuatable, respectively. In embodiments, the recoat head actuator 144 and the print head actuator 154 are bi-directionally actuatable independent of one another. The recoat motion axis 146 and the print motion axis 156 extend in a horizontal direction and are parallel with the working axis 116 (FIG. 1) of the apparatus 100. In the embodiments described herein, the recoat motion axis 146 and the print motion axis 156 are co-linear. With this configuration, the recoat head 140 and the print head 150 may occupy the same space (or portions of the same space) along the working axis 116 of the apparatus 100 at different times because the recoat motion axis 146 and the print motion axis 156 lie along the same line. In the embodiment of the actuator assembly 102 depicted in FIGS. 2A-2C, the recoat motion axis 146 and the print motion axis 156 are located in the same vertical plane. In embodiments where the support 182 is positioned in a vertical plane, the recoat motion axis 146 and the print motion axis 156 are located a vertical plane that is parallel to the vertical plane of the support 182, as depicted in FIGS. 2A-2C. However, it should be understood that other embodiments are contemplated and possible, such as embodiments in which the recoat motion axis 146 and the print motion axis 156 are located in a vertical plane that is non-parallel with the plane of the support 182.

In the embodiments described herein, the recoat head actuator 144 and the print head actuator 154 may be, for example and without limitation, mechanical actuators, electro-mechanical actuators, pneumatic actuators, hydraulic actuators, or any other actuator suitable for providing linear motion. Suitable actuators may include, without limitation, worm drive actuators, ball screw actuators, pneumatic pistons, hydraulic pistons, electro-mechanical linear actuators, or the like. In one particular embodiment, the recoat head actuator 144 and the print head actuator 154 are linear actuators manufactured by Aerotech® Inc. of Pittsburgh, Pennsylvania, such as the PRO225LM Mechanical Bearing, Linear Motor Stage.

For example, the actuator assembly 102 may comprise a guide 184 affixed to the support 182 of the rail 180. The recoat head actuator 144 and the print head actuator 154 may be moveably coupled to the rail 180 such that the recoat head actuator 144 and the print head actuator 154 can independently traverse a length of the guide 184. In embodiments, the motive force traversing the recoat head actuator 144 and the print head actuator 154 is supplied by direct-drive linear motors, such as brushless servomotors, for example.

In embodiments, the recoat head actuator 144, the print head actuator 154, and the guide 184 may be a cohesive sub-system that is affixed to the rail 180, such as when the recoat head actuator 144 and the print head actuator 154 are similar to the PRO225LM Mechanical Bearing, Linear Motor Stages, for example. However, it should be understood that other embodiments are contemplated and possible, such as embodiments where the recoat head actuator 144 and the print head actuator 154 comprise multiple components that are individually assembled onto the rail 180 to form the recoat head actuator 144 and the print head actuator 154, respectively.

Still referring to FIGS. 2A-2C, the recoat head 140 is coupled to the recoat head actuator 144 such that the recoat head 140 is situated proximate the working axis 116 (FIG. 1) of the additive manufacturing apparatus 100. Thus, bi-directional actuation of the recoat head actuator 144 along the recoat motion axis 146 affects bi-directional motion of the recoat head 140 on the working axis 116 of the additive manufacturing apparatus 100. In the embodiment of the actuator assembly 102 depicted in FIGS. 2A-2C, the recoat head 140 is coupled to the recoat head actuator 144 with strut 212 such that the recoat head 140 is cantilevered from the support 182 and positioned on the working axis 116 (FIG. 1) of the additive manufacturing apparatus 100. Cantilevering the recoat head 140 from the support 182 allows the recoat head actuator 144 and the guide 184 to be spaced apart from, for example, the build platform 120 of the additive manufacturing apparatus 100 thereby reducing the likelihood that the recoat head actuator 144, the guide 184, and associate electrical components will be fouled or otherwise contaminated with build material 400. This increases the maintenance interval for the recoat head actuator, increases the service life of the recoat head actuator, reduces machine downtime, and reduces build errors due to fouling of the recoat head actuator 144. In addition, spacing the recoat head actuator 144 apart from the build platform 120 of the apparatus 100 allows for improved visual and physical access to the build platform 120 and the supply platform 130, improving the ease of maintenance and allowing for better visual observation (from human observation, camera systems, or the like) of the additive manufacturing process. In some embodiments described herein, the recoat head 140 may be fixed in directions orthogonal to the recoat motion axis 146 and the working axis 116 (i.e., fixed along the +/−Z axis and/or fixed along the +/−Y axis).

In embodiments, the recoat head 140 may be pivotally coupled to the recoat head actuator 144. For example and without limitation, in the embodiment of the actuator assembly 102 depicted in FIGS. 2A-2C, the strut 212 is coupled to the recoat head 140 and pivotally coupled to the recoat head actuator 144 at pivot point 214. This allows the recoat head 140 to be pivoted with respect to the recoat head actuator 144 away from the working axis 116 (FIG. 1) of the apparatus 100 to facilitate, for example, maintenance or removal of components of the apparatus positioned below the recoat head 140 (e.g., the build receptacle, supply receptacle, or the like). In embodiments, the pivot point 214 may include an actuator, such as a motor or the like, to facilitate automated pivoting of the recoat head 140. In embodiments, a separate actuator (not depicted) may be provided between the recoat head 140 and the recoat head actuator 144 to facilitate automated pivoting of the recoat head 140. While FIG. 2C depicts the pivot point 214 positioned between the strut 212 and the recoat head actuator 144, it should be understood that other embodiments are contemplated and possible, such as embodiments where the pivot point 214 is positioned between the strut 212 and the recoat head 140.

Still referring to FIGS. 2A-2C, the print head 150 is coupled to the print head actuator 154 such that the print head 150 is situated proximate the working axis 116 (FIG. 2) of the additive manufacturing apparatus 100. Thus, bi-directional actuation of the print head actuator 154 along the print motion axis 156 affects bi-directional motion of the print head 150 on the working axis 116 of the additive manufacturing apparatus 100. In the embodiment of the actuator assembly 102 depicted in FIGS. 2A-2C, the print head 150 is coupled to the print head actuator 154 with strut 216 such that the print head 150 is cantilevered from the support 182 and positioned on the working axis 116 (FIG. 1) of the additive manufacturing apparatus 100. Cantilevering the print head 150 from the support 182 allows the print head actuator 154 and the guide 184 to be spaced apart from, for example, the build platform 120 of the additive manufacturing apparatus 100 thereby reducing the likelihood that the print head actuator 154, the guide 184, and associate electrical components will be fouled or otherwise contaminated with build material 400. This increases the maintenance interval for the print head actuator, increases the service life of the print head actuator, reduces machine downtime, and reduces build errors due to fouling of the print head actuator 154. In addition, spacing the print head actuator 154 apart from the build platform 120 of the apparatus 100 allows for improved visual and physical access to the build platform 120 and the supply platform 130, improving the ease of maintenance and allowing for better visual observation (from human observation, camera systems, or the like) of the additive manufacturing process. In some embodiments described herein, the print head 150 may be fixed in directions orthogonal to the recoat motion axis 146 and the working axis 116 (i.e., fixed along the +/−Z axis and/or fixed along the +/−Y axis).

In embodiments, the print head 150 may be pivotally coupled to the print head actuator 154. For example and without limitation, in the embodiment of the actuator assembly 102 depicted in FIGS. 2A-2C, the strut 216 is coupled to the print head 150 and pivotally coupled to the print head actuator 154 at pivot point 218. This allows the print head 150 to be pivoted with respect to the print head actuator 154 away from the working axis 116 (FIG. 1) of the apparatus 100 to facilitate, for example, maintenance or removal of components of the apparatus positioned below the print head 150 (e.g., the build receptacle, supply receptacle, or the like). In embodiments, the pivot point 218 may include an actuator, such as a motor or the like, to facilitate automated pivoting of the print head 150. In embodiments, a separate actuator (not depicted) may be provided between the print head 150 and the print head actuator 154 to facilitate automated pivoting of the print head 150. While FIG. 2B depicts the pivot point 218 positioned between the strut 216 and the print head actuator 154, it should be understood that other embodiments are contemplated and possible, such as embodiments where the pivot point 218 is positioned between the strut 216 and the print head 150.

In embodiments, the recoat head actuator 144 and the print head actuator 154 overlap over the build receptacle 124. As such, the range of motion of the recoat head actuator 144 (and attached recoat head 140) and the print head actuator 154 (and attached print head 150) also overlap over the build receptacle 124. In embodiments, the range of motion of the recoat head actuator (and attached recoat head 140) is greater than the range of motion of the print head actuator 154 (and attached print head 150). This is true when, for example, the apparatus 100 includes a supply receptacle 134 positioned between the build receptacle 124 and the recoat home position 148. However, it should be understood that other embodiments are contemplated and possible. For example, in embodiments (not depicted) the recoat head actuator 144 and the print head actuator 154 may overlap along the entire length of the working axis 116 of the apparatus 100. In these embodiments, the range of motion of the recoat head actuator 144 (and attached recoat head 140) and the print head actuator 154 (and attached print head 150) are co-extensive over the working axis 116 of the apparatus 100.

As noted above, in the embodiments described herein the recoat head 140 and the print head 150 are both located on the working axis 116 of the apparatus 100. As such, the movements of the recoat head 140 and the print head 150 on the working axis 116 occur along the same axis and are thus co-linear. With this configuration, the recoat head 140 and the print head 150 may occupy the same space (or portions of the same space) along the working axis 116 of the apparatus 100 at different times during a single build cycle. The recoat head 140 and the print head 150 may be moved along the working axis 116 of the apparatus 100 simultaneously in a coordinated fashion, in the same direction and/or in opposing directions, at the same speeds or different speeds. This, in turn, allows for individual steps of the additive manufacturing process, such as the distributing step (also referred to herein as the recoating step), the depositing step (also referred to herein as the printing step), the curing (or heating) step, and/or the cleaning step to be performed with overlapping cycle times. For example, the distributing step may be initiated while the cleaning step is being completed; the depositing step may be initiated while the distributing step in completed; and/or the cleaning step may be initiated while the distributing step is being completed. This may reduce the overall cycle time of the additive manufacturing apparatus 100 to less than the sum of the distributing cycle time (also referred to herein as the recoat cycle time), the depositing cycle time (also referred to herein as the print cycle time), and/or the cleaning cycle time.

Other embodiments of an actuator assembly (not shown) may be implemented in the embodiments of the additive manufacturing apparatuses 100 depicted in FIG. 1, for example, as an alternative to the actuator assembly 102. As such, it should be understood that other embodiments of the actuator assembly may be utilized to build an object on the build platform 120 in a similar manner as described herein with respect to FIGS. 1-2C.

Referring now to FIGS. 1-2C, in the embodiments described herein, the print head 150 may deposit the binder material 500 on a layer of build material 400 distributed on the build platform 120 through an array of nozzles 172 located on the underside of the print head 150 (i.e., the surface of the print head 150 facing the build platform 120). In embodiments, the array of nozzles 172 are spatially distributed in the XY plane of the coordinate axes depicted in the figures. In some embodiments, the print heads may also define the geometry of the part being built. In embodiments, the nozzles 172 may be piezoelectric print nozzles and, as such, the print head 150 is a piezo print head. In alternative embodiments, the nozzles 172 may be thermal print nozzles and, as such, the print head 150 is a thermal print head. In alternative embodiments, the nozzles 172 may be spray nozzles.

In addition to the nozzles 172, in some embodiment, the print head 150 may further comprise one or more sensors (not depicted) for detecting a property of the build material 400 distributed on the build platform 120 and/or the binder material 500 deposited on the build platform 120. Examples of sensors may include, without limitation, image sensors such as cameras, thermal detectors, pyrometers, profilometers, ultrasonic detectors, and the like. In these embodiments, signals from the sensors may be fed back to the control system (described in further detail herein) of the additive manufacturing apparatus to facilitate feedback control of one or more functions of the additive manufacturing apparatus.

Alternatively or additionally, the print head 150 may comprise at least one energy source (not depicted). The energy source may emit a wavelength or a range of wavelengths of electromagnetic radiation suitable for curing (or at least initiating curing) the binder material 500 deposited on the build material 400 distributed on the build platform 120. For example, the energy source may comprise an infrared heater or an ultraviolet lamp which emit wavelengths of infrared or ultraviolet electromagnetic radiation suitable for curing the binder material 500 previously deposited on the layer of build material 400 distributed on the build platform 120. In instances where the energy source is an infrared heater, the energy source may also preheat the build material 400 as it is distributed from the supply platform 130 to the build platform 120 that may assist in expediting the curing of subsequently deposited binder material 500.

As noted herein, the recoat head 140 is used in the additive manufacturing apparatus 100 to distribute build material 400 and, more specifically, to distribute build material 400 from the supply platform 130 to the build platform 120. That is, the recoat head 140 is used to "recoat" the build platform 120 with build material 400. It is contemplated that the recoat head 140 may include at least one of a roller, blade, or wiper to facilitate the distribution of build material 400 from the supply platform 130 to the build platform 120.

In embodiments, the recoat head 140 may further comprise at least one energy source. In these embodiments, the energy source(s) may emit a wavelength or a range of wavelengths of electromagnetic radiation suitable for curing (or at least initiating curing) the binder material 500 deposited on the build material 400 distributed on the build platform 120. For example, the energy source may comprise an infrared heater or an ultraviolet lamp which emit wavelengths of infrared or ultraviolet electromagnetic radiation, respectively, suitable for curing the binder material 500 previously deposited on the layer of build material 400 distributed on the build platform 120. In instances where the energy source is an infrared heater, the energy source may also preheat the build material 400 as it is distributed from the supply platform 130 to the build platform 120 that may assist in expediting the curing of subsequently deposited binder material 500.

In some embodiments, the recoat head 140 may further comprise at least one sensor, such as at least one sensor for detecting a property of the build material 400 distributed on the build platform 120 and/or the binder material 500 deposited on the build platform 120. Examples of sensors may include, without limitation, image sensors such as cameras, thermal detectors, pyrometers, profilometers, ultrasonic detectors, and the like. In these embodiments, signals from the sensors may be fed back to the control system (described in further detail herein) of the additive manufacturing apparatus to facilitate feedback control of one or more functions of the additive manufacturing apparatus.

Figure 3:
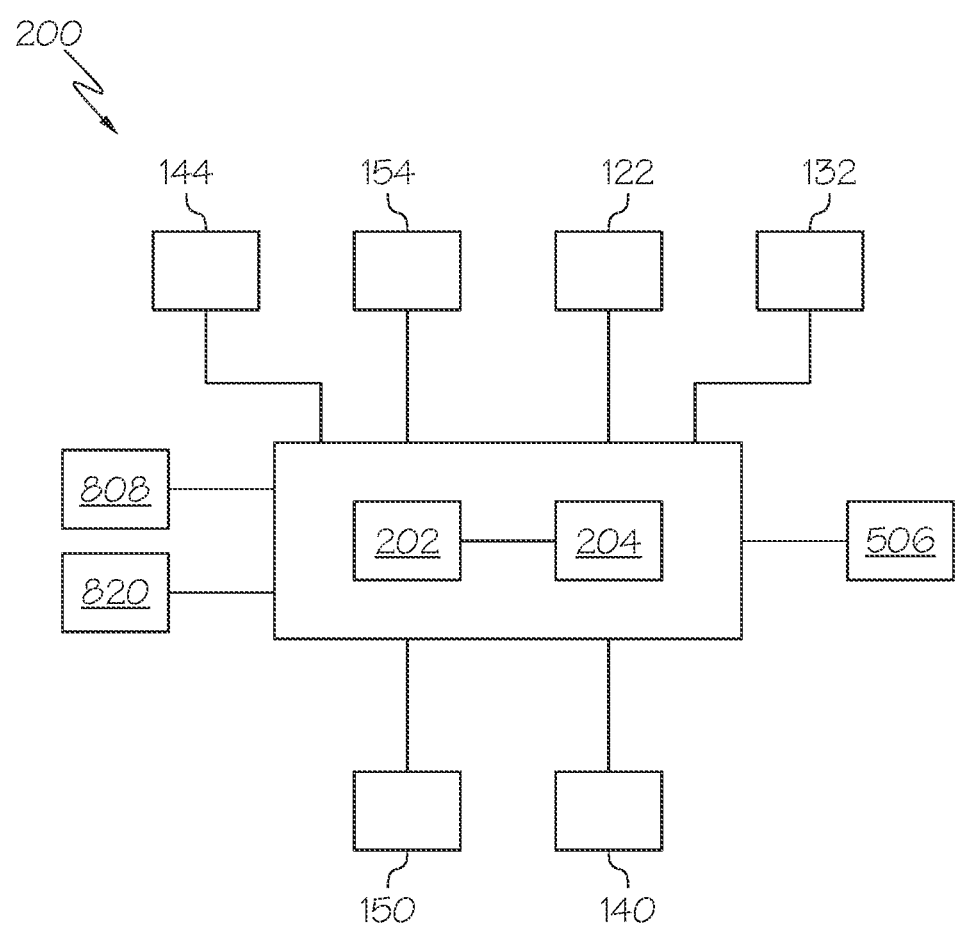
FIG. 3 schematically depicts a portion of control system for an additive manufacturing apparatus according to one or more embodiments shown and described herein.

Referring now to FIGS. 1 and 3, FIG. 3 schematically depicts a portion of a control system 200 for controlling the additive manufacturing apparatus 100 of FIG. 1 with an actuator assembly as depicted in FIGS. 2A-2C. The control system 200 is communicatively coupled to the recoat head actuator 144, the print head actuator 154, the build platform actuator 122, and the supply platform actuator 132. The control system 200 may also be communicatively coupled to the print head 150 and the recoat head 140. In embodiments where additional accessories or components are included, such as process accessories, process accessory actuators, and sensors (not depicted), the control system 200 may also be communicatively coupled to the additional components. In the embodiments described herein, the control system 200 comprises a processor 202 communicatively coupled to a memory 204. The processor 202 may include any processing component(s), such as a central processing unit or the like, configured to receive and execute computer readable and executable instructions stored in, for example, the memory 204. In the embodiments described herein, the processor 202 of the control system 200 is configured to provide control signals to (and thereby actuate) the recoat head actuator 144, the print head actuator 154, the build platform actuator 122, the supply platform actuator 132, and any additional components (when included). The processor 202 may also be configured to provide control signals to (and thereby actuate) the print head 150 and the recoat head 140. The control system 200 may also be configured to receive signals from one or more sensors of the recoat head 140 and, based on these signals, actuate one or more of the recoat head actuator 144, the print head actuator 154, the build platform actuator 122, the supply platform actuator 132, the print head 150, and/or the recoat head 140.

In the embodiments described herein, the computer readable and executable instructions for controlling the additive manufacturing apparatus 100 are stored in the memory 204 of the control system 200. The memory 204 is a non-transitory computer readable memory. The memory 204 may be configured as, for example and without limitation, volatile and/or nonvolatile memory and, as such, may include random access memory (including SRAM, DRAM, and/or other types of random access memory), flash memory, registers, compact discs (CD), digital versatile discs (DVD), and/or other types of storage components.

The operation of the additive manufacturing apparatus 100 will now be described in further detail with specific reference to FIGS. 1, 3, and 2A-2C.

Referring to FIG. 1, the additive manufacturing apparatus 100 is schematically depicted at initiation of a build cycle. The phrase "build cycle," as used herein, refers to the process of building a single layer of an object on the build platform 120. In the embodiments described herein, the "build cycle" may include one iteration each of raising the supply platform 130, lowering the build platform 120, distributing a new layer of build material 400 from the supply platform 130 to the build platform 120, depositing binder material 500 on the new layer of build material 400 distributed on the build platform 120, and optionally the cleaning of the print head 150.

In describing the operation of the additive manufacturing apparatus 100, specific reference will be made herein to build material 400 and binder material 500. The build material generally comprises a powder material that is spreadable or flowable. Categories of suitable powder material include, without limitation, dry powder material and wet powder material (e.g., a powder material entrained in a slurry). In embodiments, the build material may be capable of being bound together with the binder material. In embodiments, the build material may also be capable of being fused together, such as by sintering. In embodiments, the build material may be an inorganic powder material including, for example and without limitation, ceramic powders, metal powders, glass powders, carbon powder, sand, cement, calcium phosphate powder, and various combinations thereof. In embodiments, the build material may comprise an organic powder material including, for example and without limitation, plastic powders, polymer powders, soap, powders formed from foodstuff (i.e., edible powders), and various combinations thereof. In some embodiments, the build material may be (or include) pharmaceutically active components, such as when the build material is or contains a pharmaceutical. In embodiments, the build material may be a combination of inorganic powder material and organic powder material.

The build material may be uniform in size or non-uniform in size. In embodiments, the build material may have a powder size distribution such as, for example and without limitation, a bi-modal or tri-modal powder size distribution. In embodiments, the build material may be, or may include, nanoparticles.

The build material may be regularly or irregularly shaped, and may have different aspect ratios or the same aspect ratio. For example, the build material may take the form of small spheres or granules, or may be shaped like small rods or fibers.

In embodiments, the build material can be coated with a second material. For example and without limitation, the build material may be coated with a wax, a polymer, or another material that aids in binding the build material together (in conjunction with the binder). Alternatively or additionally, the build material may be coated with a sintering agent and/or an alloying agent to promote fusing the build material.

The binder material may comprise a material which is radiant-energy curable and which is capable of adhering or binding together the build material when the binder material is in the cured state. The term "radiant-energy curable," as used herein, refers to any material that solidifies in response to the application of radiant energy of a particular wavelength and energy. For example, the binder material may comprise a known photopolymer resin containing photoinitiator compounds functioning to trigger a polymerization reaction, causing the resin to change from a liquid state to a solid state. Alternatively, the binder material may comprise a material that contains a solvent that may be evaporated out by the application of radiant energy. The uncured binder material may be provided in solid (e.g., granular) form, liquid form including a paste or slurry, or a low viscosity solution compatible with print heads. The binder material may be selected to have the ability to out-gas or burn off during further processing, such as during sintering of the build material. In embodiments, the binder material may be as described in U.S. Patent Publication No. 2018/0071820 entitled "Reversible Binders For Use In Binder Jetting Additive Manufacturing Techniques" and assigned to General Electric Corporation, Schenectady, NY. However, it should be understood that other binder materials are contemplated and possible, including combinations of various binder materials.

Referring initially to FIG. 1, at initiation of the build cycle, the control system 200 sends a control signal to the supply platform actuator 132 that actuates the supply platform actuator 132 in the upward vertical direction (i.e., in the +Z direction of the coordinate axes depicted in the figures) as indicated by arrow 316, thereby moving the supply platform 130, and the build material 400 positioned thereon, in the upward vertical direction towards the working axis 116 of the apparatus 100. The supply platform 130 is moved in the upward vertical direction by an amount sufficient to position a predetermined amount of the build material 400 in the pathway of the recoat head 140 as it traverses over the working axis 116 of the apparatus 100. While FIG. 1 schematically depicts an initiation of a build cycle in which binder material 500 is already present on a layer of build material 400 (such as on a previously distributed layer of build material 400), it should be understood that the initiation of the build cycle may occur without any build material 400 or binder material 500 disposed on the build platform 120.

While FIGS. 1 and 2A-2C schematically depict an embodiment of an actuator assembly 102, it should be understood that other embodiments are contemplated and possible, such as embodiments different number of supports and/or actuators. Moreover, it is contemplated that embodiments may include a multiple supports, each having one of the recoat head actuator 144 and the print head actuator 154 mounted thereto.

Cleaning Station

Turning now to FIGS. 4A-4D, an embodiment of the cleaning station 110 is shown in greater detail. Although described in various embodiments as being associated with the additive manufacturing apparatus 100 of FIGS. 1 and 2A-2C, it is contemplated that the cleaning station 110 and fluid management system coupled thereto may be used with other types of additive manufacturing and printing apparatuses known and used in the art.

The cleaning station 110 may comprise a cleaning station vessel 314 positioned about a binder purge bin 302, a purge wiper section 303, a wet cleaner section 304, a dry wiper section 306, a spit capture tray 307, and a capping section 308. In various embodiments, the purge wiper section 303, the wet cleaner section 304, the dry wiper section 306, the spit capture tray 307, and the capping section 308 are positioned above the cleaning station vessel 314, each containing a volume of cleaning fluid. As will be described in greater detail below, the cleaning station vessel 314 is configured to collect cleaning fluid overflowing from these sections and provide the collected cleaning fluid to a cleaning fluid receptacle.

Figure 4A:
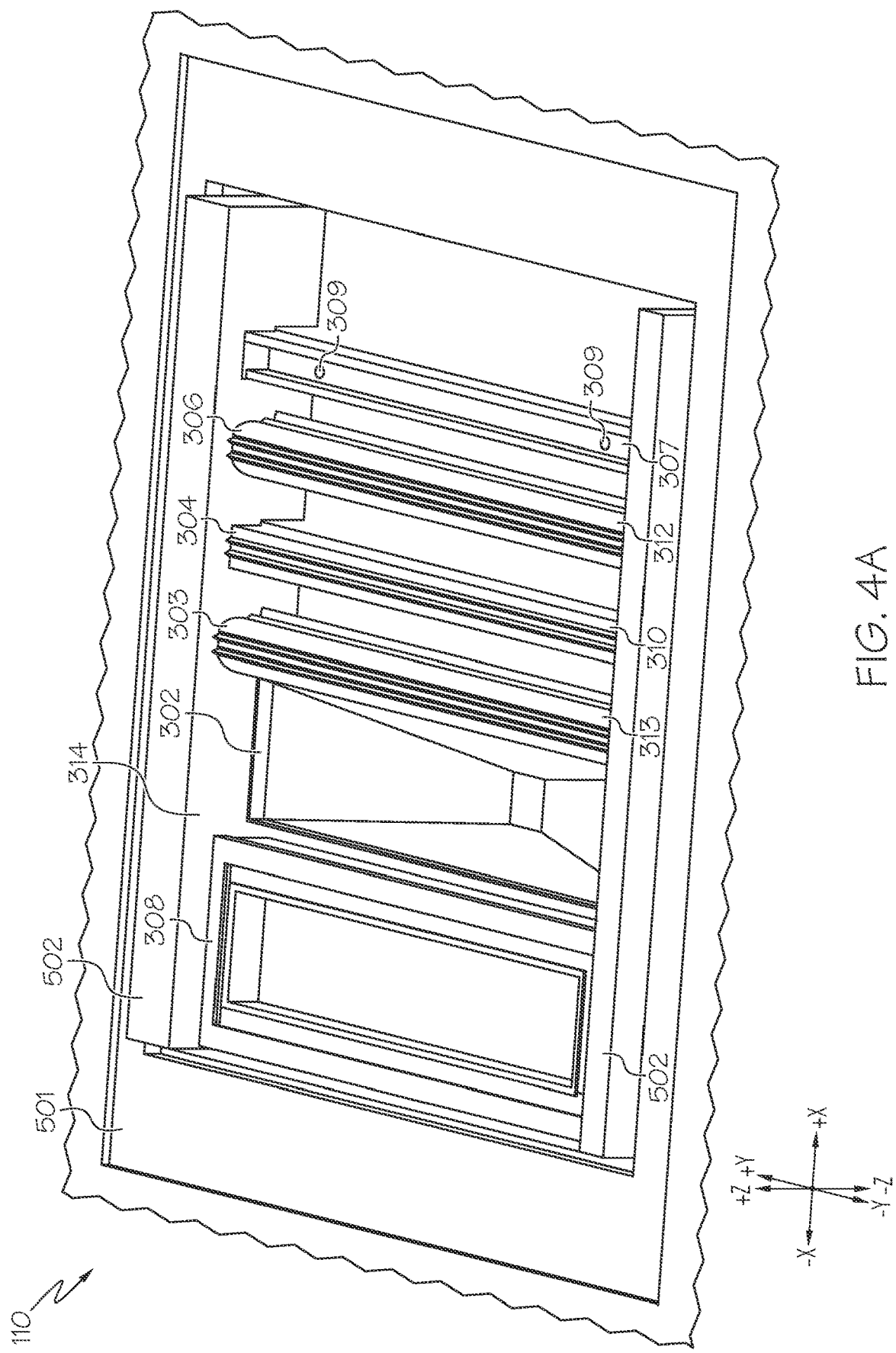
FIG. 4A is a perspective top view of a cleaning station of an additive manufacturing apparatus according to one or more embodiments shown and described herein.
Figure 4B:
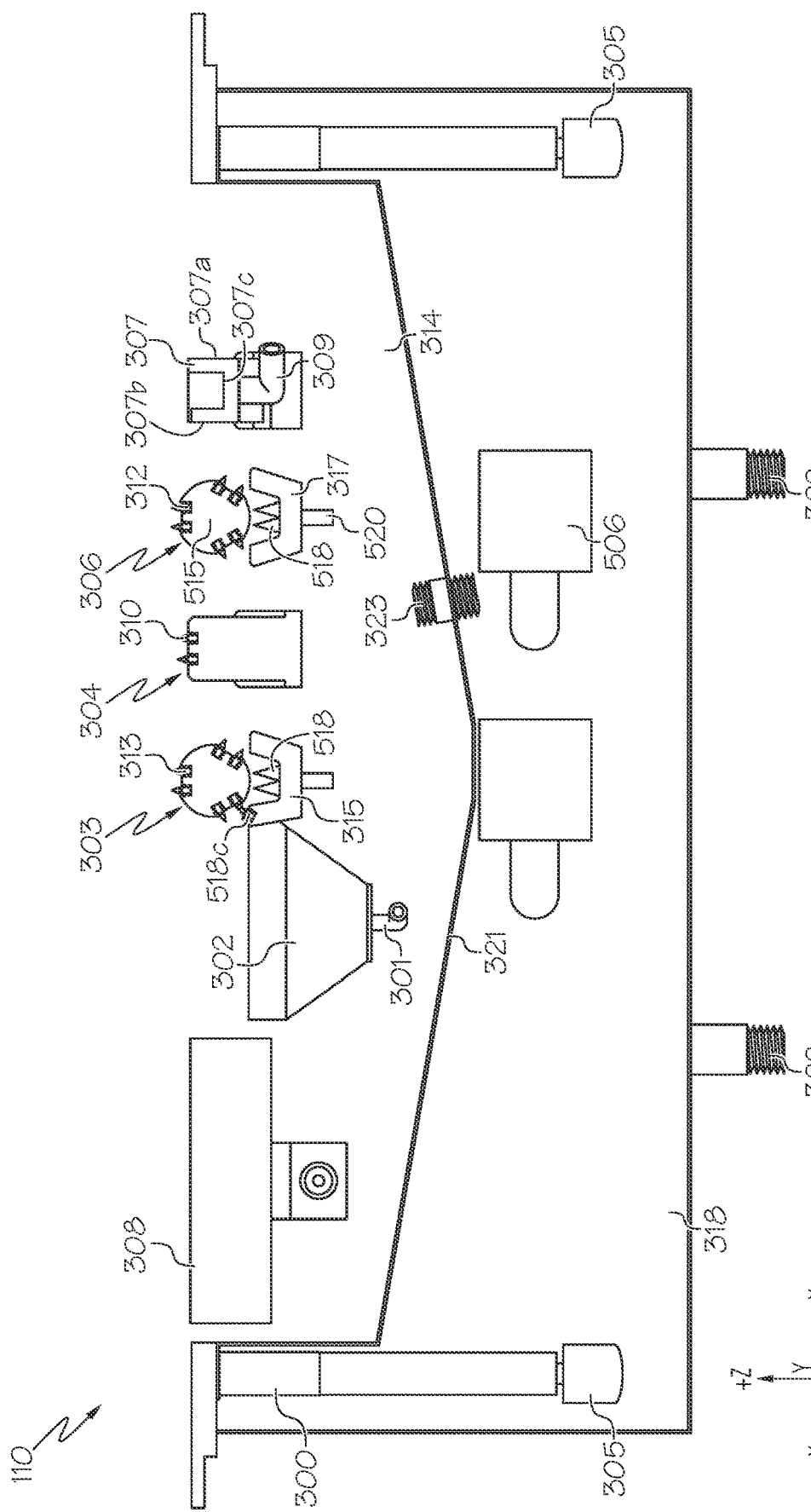
FIG. 4B is a side cross-sectional view of the cleaning station of FIG. 4A.
Figure 4C:
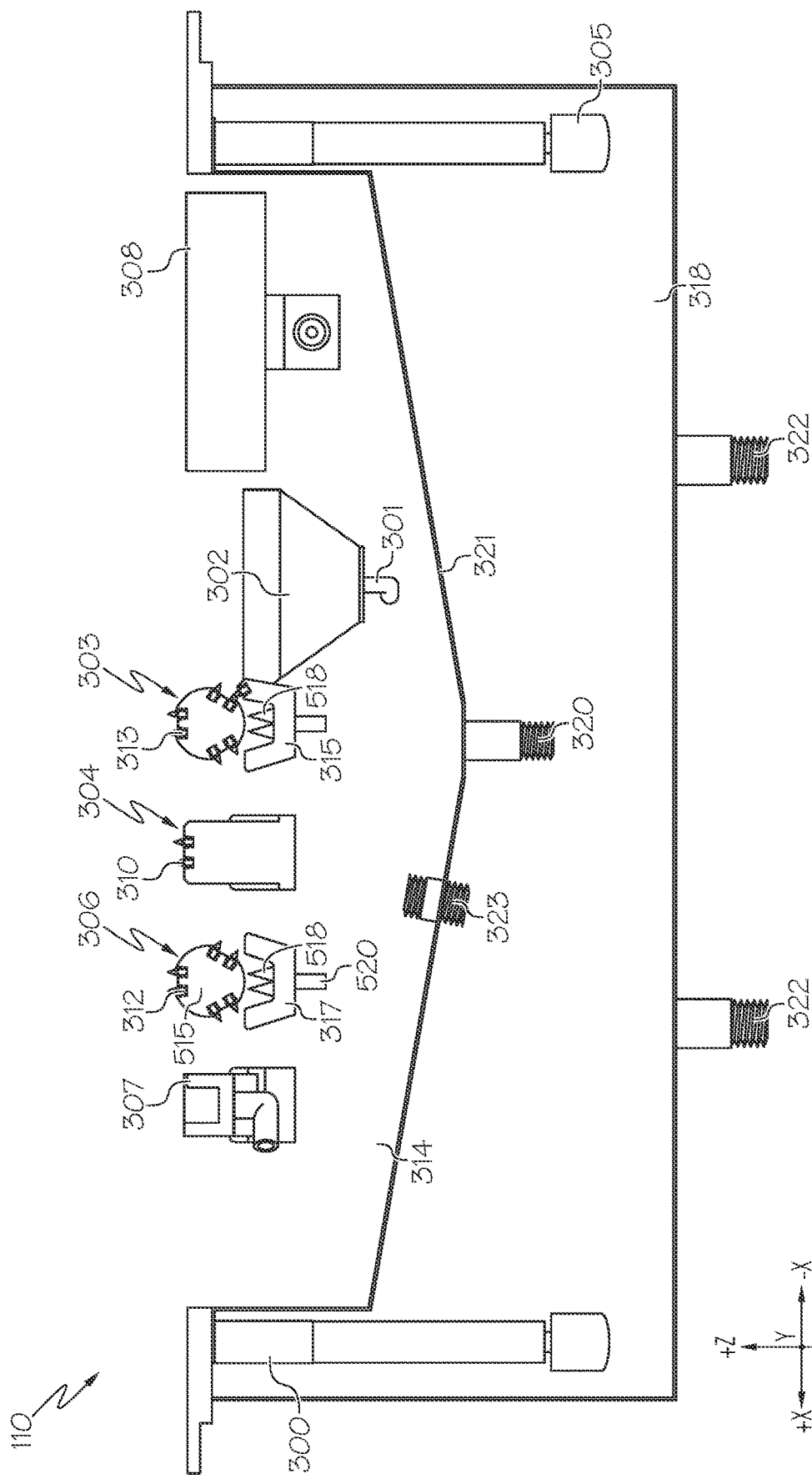
FIG. 4C is an opposite side cross-sectional view of the cleaning station of FIG. 4A.
Figure 9:
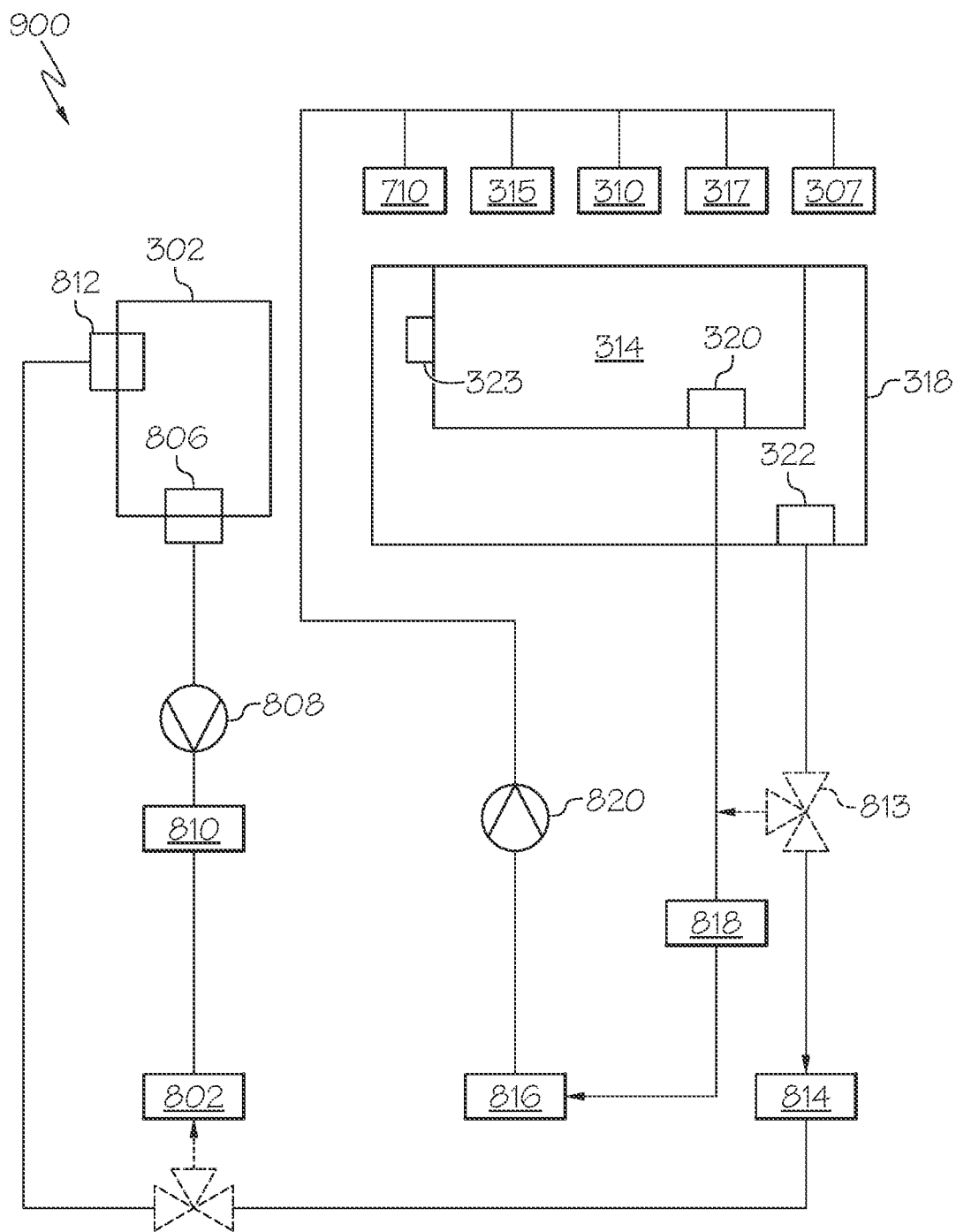
FIG. 9 is a process flow diagram of the fluid management system (binder pathway and the cleaning fluid pathway) according to one or more embodiments shown and described herein.

As shown in FIGS. 4A-4C, the cleaning station 110 includes a binder purge bin 302, which is configured to receive material, such as contaminants and binder material, discharged by the print head. In embodiments, the cleaning station 110 additionally includes a purge wiper section 303 positioned between the binder purge bin 302 and the wet cleaner section 304. The purge wiper section 303 includes a purge wipe member 313 which contacts the print head after contaminants and binder material are discharged into the binder purge bin 302 to remove remaining contaminants and binder material from the face of the print head before the print head is introduced to the wet cleaner section 304. In embodiments, the purge wipe member 313 redirects the loose contaminants and binder material into the binder purge bin 302 for disposal (as shown in FIGS. 4B and 4C), thereby reducing the amount of contaminants and binder material introduced into the cleaning station vessel 314 during the cleaning process. In embodiments, the binder purge bin 302 includes a drain 301 through which the binder purge bin 302 is fluidly coupled to a binder reservoir 802 or waste reservoir 814 (FIG. 9).

The purge wiper section 303 further includes a purge wipe reservoir 315. In embodiments, the purge wipe reservoir 315 is positioned vertically below the purge wipe member 313 and maintains a volume of cleaning fluid through which the purge wipe member 313 is rotated for cleaning the purge wipe member 313. By maintaining a suitable volume of cleaning fluid located for contact with the purge wipe member 313, the purge wipe reservoir 315 may reduce a total amount of cleaning fluid utilized by the cleaning station 110, as compared to cleaning stations including a large tank of cleaning fluid for use by multiple cleaning components.

Figure 5:
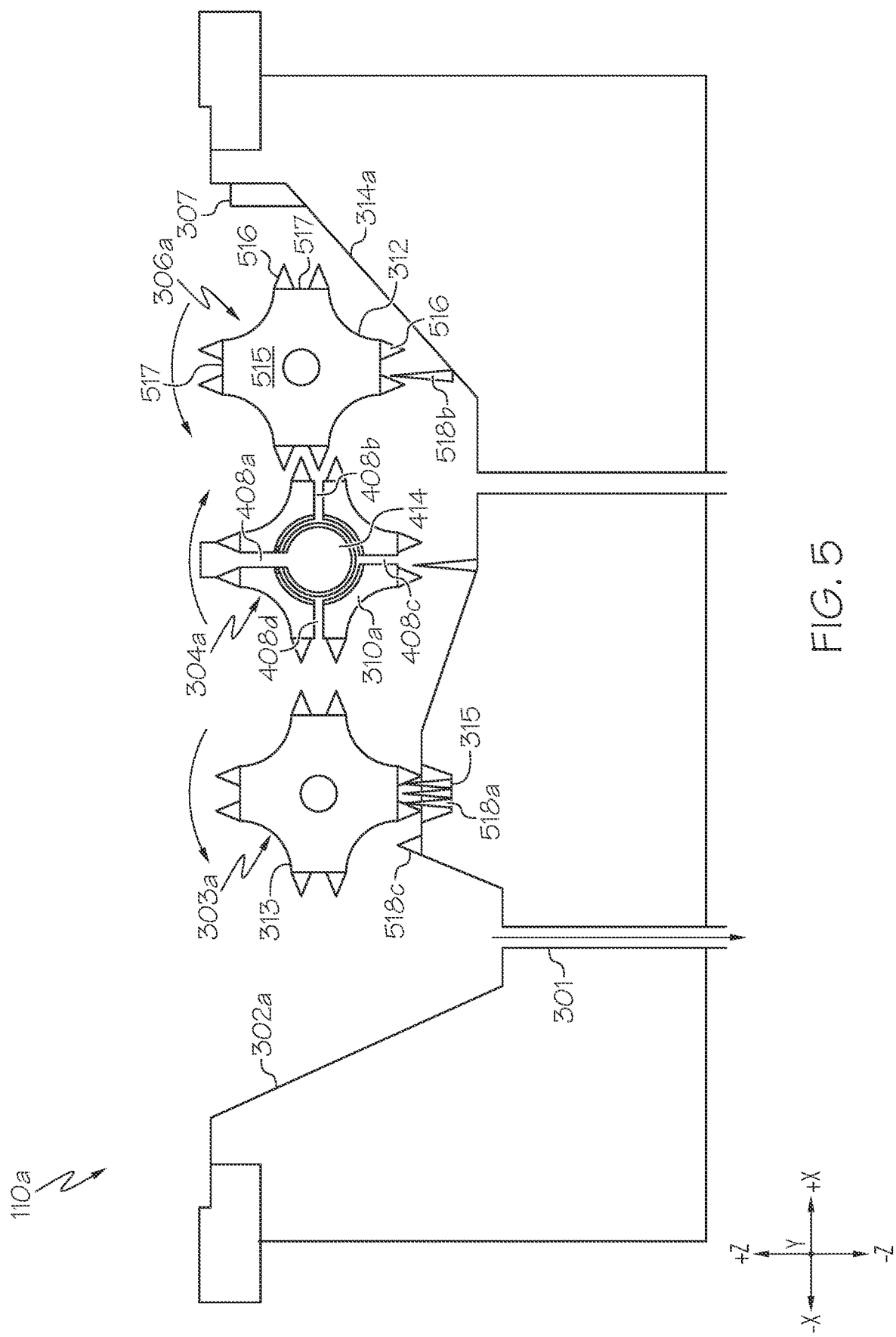
FIG. 5 is a side cross-sectional view of a cleaning station of an additive manufacturing apparatus according to one or more embodiments shown and described herein.

The wet cleaner section 304 applies cleaning fluid to the print head, specifically, a faceplate of the print head. In embodiments, the wet cleaner section 304 includes a stationary wet cleaning member 310 (as shown in FIGS. 4A-4C and 7A-7F), although in other embodiments, the wet cleaner section 304 can include a rotating or Z-actuating wet cleaning member 310a (as shown in FIG. 5).

The dry wiper section 306, which in some embodiments is downstream of the wet cleaner section 304, removes excess liquid (e.g., cleaning fluid and contaminants) from the print head in advance of binder jetting. Similar to the purge wiper section 303, the dry wiper section 306 includes a dry wipe member 312 which contacts the print head after cleaning fluid is applied to the print head by the wet cleaning member 310 to remove contaminants and binder material dissolved by the cleaning fluid, as well as excess cleaning fluid, from the face of the print head before the print head prints another layer of binder material. The dry wiper section 306 further includes a dry wipe reservoir 317. In embodiments, the dry wipe reservoir 317 is positioned vertically below the dry wipe member 312 and maintains a volume of cleaning fluid through which the dry wipe member 312 is rotated for cleaning the dry wipe member 312. By maintaining a suitable volume of cleaning fluid located for contacting the dry wipe member 312, the dry wipe reservoir 317 may reduce a total amount of cleaning fluid utilized by the cleaning station 110, as compared to cleaning stations including a large tank of cleaning fluid for use by multiple cleaning components. In embodiments, the dry wiper section 306 and the purge wiper section 303 may have the same or similar construction. As shown in FIGS. 4A-4C, the dry wiper section 306 is located between the wet cleaner section 304 and the spit capture tray 307 along the +/−X direction in the FIGS. and parallel to the working axis 116.

The spit capture tray 307 collects an amount of binder material ejected by the print head as it prepares for printing. For example, in embodiments, the print head ejects a small amount of binder material as it is primed to printing and re-establishes the meniscus at each nozzle needed to ensure that the binder material is properly ejected during printing operations. In embodiments, the spit capture tray 307 maintains a volume of liquid (e.g., cleaning fluid or binder material) into which the binder material from the print head is ejected. It is believed that the volume of liquid provides improved retention of the binder material that is ejected from the print head since the binder material is ejected in such small volumes that it may otherwise aerosolize and be caught in the air flow path generated during movement of the print head. In embodiments, the spit capture tray 307 includes a first side wall 307a and a second side wall 307b that is parallel to the first side wall 307a. A bottom wall 307c extends between and separates the first side wall 307a and the second side wall 307b. In embodiments, a height of the first side wall 307a is less than a height of the second side wall 307b. Alternatively, the height of the second side wall 307b may be less than the height of the second side wall 307b. Such a construction enables the volume of liquid (and the binder material ejected into the spit capture tray 307) to flow over the side wall having the lower height and into the cleaning station vessel 314. However, in embodiments, the first side wall 307a has a height that is equal to a height of the second side wall 307b. In such embodiments, the volume of liquid (and the binder material ejected into the spit capture tray 307) flows over both of the side walls. Accordingly, in embodiments in which the side walls are of equal height, the spit capture tray 307 may be self-cleaning, as the cleaning fluid continually flows over the walls to clean the spit capture tray 307. Alternatively, in embodiments, the spit capture tray 307 may include at least one fluid outlet (not shown) through which the liquid can flow out of the spit capture tray 307. Accordingly, in some such embodiments, the liquid can be recycled, such as by connecting the fluid outlet to the cleaning fluid reservoir 816 or binder reservoir 802 (FIG. 9), or sent to a waste reservoir 814 (FIG. 9).

In embodiments, the spit capture tray 307 includes at least one fluid inlet 309 through which cleaning fluid is provided to the spit capture tray 307. As shown in the embodiment in FIGS. 4A and 4B, the spit capture tray 307 includes two fluid inlets 309 positioned in the bottom wall 307c of the spit capture tray 307, although it is contemplated that, in other embodiments, the fluid inlet(s) 309 can be positioned in the first side wall 307a, the second side wall 307b, or lateral walls extending between the first side wall and the second side wall (not shown). In embodiments in which two or more fluid inlets are included, each fluid inlet may be in the same wall as the other fluid inlet(s), or in a different wall than the other fluid inlet(s). As will be described in greater detail below, cleaning fluid is provided to the fluid inlet(s) 309 by the cleaning fluid reservoir 816 (FIG. 9).

The capping section 308, which may be also considered an idle section, is a location where the print head may be temporarily placed in advance of binder jetting. In embodiments, the capping section 308 supplies cleaning fluid to the print head faceplate to prevent binder from drying on the print head. Without being limited to theory, maintaining the purge wiper section 303, wet cleaner section 304, the dry wiper section 306, the spit capture tray 307, and the capping section 308 within a single cleaning station vessel 314 is highly advantageous as it streamlines cleaning fluid management by eliminating the need to control three separate cleaning station vessels. In this embodiment, cleaning fluid maintenance is limited to a single cleaning station vessel 314.

Moreover, as shown in FIGS. 4B-4D, in embodiments, a bottom surface 321 of the cleaning station vessel 314 is sloped or angled in two directions (e.g., in the X and Y directions) to direct cleaning fluid to a main cleaning vessel drain 320. In other words, the bottom surface is angled with respect to a horizontal plane and with respect to a vertical plane. The main cleaning vessel drain 320 is positioned at a point within the cleaning station vessel that is the lowest vertical point of the cleaning station vessel. Accordingly, the cleaning fluid may be continuously pumped into the purge wiper section 303, the wet cleaner section 304, the dry wiper section 306, and the spit capture tray 307 and flow into the cleaning station vessel 314. When the cleaning fluid in the cleaning station vessel 314 reaches the main cleaning vessel drain 320, the cleaning fluid flows through the main cleaning vessel drain 320 and is returned to a cleaning fluid reservoir, as will be discussed in greater detail below. The main cleaning vessel drain 320 may be, for example, a passive drain that enables the cleaning fluid to flow through it, or an active drain that actively removes the cleaning fluid from the cleaning station vessel 314. It should be understood that, although not shown in FIGS. 4B-4D, the main cleaning vessel drain 320 is in fluid communication with a cleaning fluid reservoir, such as through piping or tubing and filters. In embodiments, the cleaning station vessel 314 is sized to contain a volume of fluid that is greater than or equal to a maximum amount of fluid that can be supplied to the additive manufacturing apparatus 100. For example, the cleaning station vessel 314 may be sized to receive and contain at least the volume of cleaning fluid contained in the cleaning fluid reservoir and in the binder material reservoir such that, in the event of a failure, all fluid in the machine can be retained within the cleaning station vessel 314.

In embodiments, the cleaning station vessel 314 is in fluid communication with an overflow vessel 318, as shown in FIGS. 4B-4D, such as through an overflow drain 323. The overflow drain 323 enables cleaning fluid that accumulates within the cleaning station vessel 314 to be removed from the cleaning station vessel 314 through an alternative flow path. For example, if the main cleaning vessel drain 320 becomes clogged, cleaning fluid may accumulate within the cleaning station vessel 314 to a liquid height that is greater than a vertical position of the top of the overflow drain 323. Accordingly, additional fluid may flow through the overflow drain 323 and into the overflow vessel 318. As shown in FIGS. 4B-4D, the overflow vessel 318 includes at least one overflow vessel drain 322. In embodiments, cleaning fluid that is drained from the cleaning station vessel 314 into the overflow vessel 318 is drained from the overflow vessel 318 through the at least one overflow vessel drain 322, where it may be recombined with the cleaning fluid drained from the main cleaning vessel drain 320 and provided to the cleaning fluid reservoir 816 (FIG. 9). The at least one overflow vessel drain 322 may be, for example, a passive drain that enables the cleaning fluid to flow through it, or an active drain that actively removes the cleaning fluid from the overflow vessel 318. It should be understood that, although not shown in FIGS. 4B-4D, the at least one overflow vessel drain 322 is in fluid communication with a cleaning fluid reservoir, such as through piping or tubing. In embodiments, the overflow vessel 318 is sized to contain a volume of fluid that is greater than or equal to a maximum amount of fluid that can be supplied to the additive manufacturing apparatus 100. For example, the overflow vessel 318 may be sized to receive and contain at least the volume of cleaning fluid contained in the cleaning fluid reservoir and in the binder material reservoir such that, in the event of a failure, all fluid in the machine can be retained within the overflow vessel 318.

As can be seen in FIGS. 4B-4D, in embodiments, various components of the cleaning station 110 are mounted to a cleaning station frame 300. The cleaning station frame 300 enables the various components of the cleaning station 110, including the binder purge bin 302, the purge wiper section 303, the wet cleaner section 304, the dry wiper section 306, the spit capture tray 307, and the capping section 308 to be oriented and aligned with respect to one another and mounted within the additive manufacturing apparatus 100. In embodiments, the cleaning station frame 300 is coupled to feet 305. The feet 305 can enable the components of the cleaning station components to be mounted to the cleaning station frame 300, properly aligned, and/or tested on a bench or other worktop surface before being mounted within the additive manufacturing apparatus 100. Accordingly, in embodiments, the cleaning station frame 300 and the feet 305 can be used to associate the various components of the cleaning station 110 into a module that can be installed into and removed from the additive manufacturing apparatus.

In various embodiments, the cleaning station 110 further includes a top plate 501. The top plate 501, as shown in FIG. 4A, provides a surface through which the cleaning station 110 can be mounted within the additive manufacturing apparatus. Additionally, in embodiments, the top plate 501 may prevent build material and fluids (including, for example, cleaning fluid and binder material) from being deposited in other areas of the apparatus, such as between the cleaning station 110 and the working surface of the additive manufacturing apparatus 100.

In the embodiment shown in FIGS. 4A and 4D, a cover plate 502 is positioned along the length of the cleaning station 110 (in the +/−X direction in the FIGS.) from one end of the top plate 501 to the opposite end of the top plate 501. In embodiments, the cover plate 502 covers mounting and motion components of the various sections of the cleaning station 110 to prevent fluids from contacting such components, and redirects any fluids contacting the cover plate 502 into the cleaning station vessel 314. As shown in FIG. 4D, in embodiments, the cover plate 502 may be mounted to an interior of the overflow vessel 318, pass through, for example, a slot formed in the top plate 501, extend over the mounting and motion components, and is mounted to an interior of the cleaning station vessel 314. In embodiments, the cover plate 502 may be mounted directly to the cleaning station vessel 314, or the cover plate 502 may be mounted to the cleaning station vessel 314 indirectly, such as through one or more linking components positioned between the cover plate 502 and the cleaning station vessel 314. However, it is contemplated that some embodiments may not include the cover plate 502.

FIG. 5 depicts an alternative embodiment of a cleaning station, referred to in FIG. 5 as cleaning station 110a. Like cleaning station 110, the cleaning station 110a includes a binder purge bin 302a, a purge wiper section 303a, a wet cleaner section 304a, a dry wiper section 306a, and a spit capture tray 307. The cleaning station 110a does not include a capping section 308, although in embodiments, a capping section 308 may be included. As shown in FIG. 5, the binder purge bin 302a may be considered to be a section of the cleaning station vessel 314a of the cleaning station 110a, although it is constructed to contain a volume distinct from a volume contained by the cleaning station vessel 314a. In embodiments, the binder purge bin 302a may overflow into the cleaning station vessel 314a, and/or the cleaning station vessel 314a may overflow into the binder purge bin 302a.

In contrast to the embodiment depicted in FIGS. 4A-4C, in FIG. 5, the cleaning station 110a includes a wet cleaner section 304a that includes a wet cleaning member 310a. The wet cleaning member 310a is a rotating wipe member, similar in construction to purge wipe member 313 and/or dry wipe member 312, described above and below. However, in contrast to the purge wipe member 313 and the dry wipe member 312, the wet cleaning member 310a includes a fluid channel (shown as fluid channels 408a, 408b, 408c, and 408d in FIG. 5 and generally referred to as fluid channel 408) extending along a length of the wet cleaning member 310a (e.g., in the +/−Y direction in the FIGS.) for providing cleaning fluid to the face of the print head. Accordingly, as the wet cleaning member 310a rotates, cleaning fluid may be filled in the fluid channel 408 (e.g., fluid channel 408a) or emptied from the fluid channel 408 (e.g., fluid channels 408b and 408c) to clean the wet cleaning member 310a. In embodiments, the wet cleaning member 310a includes a cleaning manifold 414 that is fluidly coupled to the cleaning fluid supply (not shown) and to the fluid channel 408, such that the cleaning manifold 414 receives cleaning fluid from the cleaning fluid supply and supplies the cleaning fluid to the fluid channel 408.

The cleaning station 110a also includes a dry wiper section 306a. In contrast to the dry wiper section 306 in FIGS. 4A-4C, the dry wiper section 306a includes the dry wipe member 312, but does not include a dry wiper reservoir. In particular, in the embodiment shown in FIG. 5, the dry wipe member 312 may be cleaned through contact with the wet cleaning member 310a. In particular, the dry wipe member 312 rotates in a direction opposite of a direction of rotation of the wet cleaning member 310a such that wiper blades from the dry wipe member 312 and the wet cleaning member 310a engage with one another and the cleaning fluid from the fluid channel being emptied (e.g., fluid channel 408b) contacts the wiper blades of the dry wipe member 312. Accordingly, the wet cleaning member 310a may serve the function of the dry wiper reservoir by providing a volume of cleaning fluid to clean the dry wipe member 312.

It should be understood that, in embodiments, cleaning station 110a can be substituted for cleaning station 110, and elements included in cleaning station 110a can be used in cleaning station 110, and vice versa. Accordingly, although depicted as separate embodiments, it is contemplated that embodiments may incorporate features from one or both of the cleaning stations 110 and 110a.

Referring again to FIGS. 1 and 2A, in the embodiments described herein, the print head 150 may deposit the binder material 500 on a layer of build material 400 distributed on the build platform 120 through an array of nozzles 172 located on the underside of the print head 150 (i.e., the surface of the print head 150 facing the build platform 120). In one or more embodiments, the nozzles 172 may be piezoelectric print nozzles and, as such, the print head 150 is a piezo print head. In alternative embodiments, the nozzles 172 may be thermal print nozzles and, as such, the print head 150 is a thermal print head.

In general, after the print head 150 has deposited the binder material 500 on the layer of build material 400 positioned on the build platform 120 (FIG. 1), it is moved to the binder purge bin 302, where contaminants are dislodged via backpressure and, in embodiments, using binder material 500 ejected from the nozzles 172. Next, the print head 150 is wiped by the purge wipe member 313 as it is moved through the purge wiper section 303 from the binder purge bin 302 toward the wet cleaner section 304 to direct loose contaminants and binder material from the face of the print head 150 into the binder purge bin 302. Next, the print head 150 is moved to the wet cleaner section 304 where a cleaning fluid is applied to the print head 150. The print head 150 is then moved to the dry wiper section 306 where the cleaning fluid and remaining contaminants are removed, before the print head 150 is moved to the spit capture tray 307. At the spit capture tray 307, any remaining contaminants are dislodged and the binder meniscus is reestablished by ejecting binder material 500 from the nozzles 172. In embodiments in which the print head 150 is idle, instead of moving to the spit capture tray 307, the print head 150 may be moved to the capping section 308 where it is kept moist to prevent the binder material from drying out and clogging the nozzles 172 of the print head 150. Each of the sections of the cleaning station 110 will now be described in greater detail.

Cleaning Station—Dry Wipe Cleaner Section and Purge Wiper Section

Various suitable embodiments are contemplated for the dry wiper section 306 and the purge wiper section 303. In particular, the dry wiper section 306 and the purge wiper section 303 may include identical or similar features and/or may include features that are different from each other. Accordingly, in embodiments described herein, reference will be made to the dry wiper section 306 its corresponding components, and it should be understood that the description equally applies to the purge wiper section 303 and its corresponding components.

Referring to the embodiments depicted in FIGS. 4A-4D, the dry wiper section 306 comprises a dry wipe member 312 and a dry wipe reservoir 317. The dry wipe member 312 includes a dry wiper body 515 having at least one wiper blade 516 extending radially therefrom. In embodiments, such as the embodiments shown in FIGS. 5 and 6A-6H, the dry wiper body 515 has a predetermined number of planar faces 517, and each wiper blade 516 extends radially from one of the planar faces 517. The number of planar faces 517 can vary depending on the particular embodiments. For example, in embodiments, the dry wiper body 515 can include 1, 2, 3, 4, 5, 6, or more planar faces 517. However, it is contemplated that, in embodiments, the dry wiper body 515 can have a circular cross-section, and may not include planar faces, as shown in FIGS. 4A-4C. Moreover, the number of wiper blades extending from each planar face 517, and the total number of wiper blades extending from the dry wipe member 312 can vary depending on the particular embodiment. For example, in the embodiments shown in FIGS. 4B and 4C, wiper blades 516 are positioned in pairs with two wiper blades 516 positioned at each of three locations around the circumference of the dry wiper body 515 such that the dry wipe member 312 includes 6 wiper blades. As another example, in the embodiments shown in FIGS. 5 and 6, each dry wiper body 515 includes four planar faces 517, and each planar face 517 includes two wiper blades 516 extending therefrom, for a total of eight wiper blades 516 per dry wipe member 312. The wiper blades 516 can be mounted to the dry wiper body 515 in any suitable manner, including, but not limited to adhering the wiper blades 516 to the surface of the dry wiper body 515, mating features that enable the wiper blades 516 to be received by the dry wiper body 515 (such as those shown and described with respect to the wet cleaning member 310 described hereinbelow), or the like.

As shown in the FIGS., in embodiments, the dry wipe member 312 includes various groups of wiper blades 516. Each group of wiper blades 516 can include from one to five wiper blades 516, with the groups being equally spaced around the outer surface of the dry wiper body 515. For example, when three groups of wiper blades are included, each group is located about 1200 from each of the other groups; when four groups of wiper blades are included, each group is located about 900 from each adjacent group, and the like. Accordingly, the dry wipe member 312 can be rotated a portion of a rotate about a rotational axis 519 (FIG. 4D) to move at least some of the wiper blades 516 into a position for contacting the face of the print head 150, or into a position to not contact the face of the print head 150.

In embodiments, the dry wipe member 312 is coupled to a motor 506 (FIGS. 4B and 4D) that rotates the dry wipe member 312 about the rotational axis 519. The motor 506 can be, for example, a motor 506 coupled to a belt 507, which is in turn coupled to a pulley 508. The pulley 508 is affixed to a shaft 509 extending from a center of the dry wipe member 312. In various embodiments, the shaft 509 extends from the dry wipe member 312 in a direction along the rotational axis 519, and the shaft 509 is in a fixed relationship with the dry wipe member 312 such that rotation of the shaft 509 causes rotation of the dry wipe member 312 in the same direction. In embodiments, the motor 506 can be coupled to the belt 507 through a pulley (not shown). Accordingly, when the motor 506 is activated, it drives the belt 507, which rotates the pulley 508 and, therefore, the shaft 509 of the dry wipe member 312. As the shaft 509 is rotated, the dry wipe member 312 rotates about the rotational axis 519, moving the wiper blades 516 in a circular motion around the rotational axis 519.

In the embodiment shown in FIG. 4B, each of the dry wipe member 312 and the purge wipe member 313 is coupled to its own corresponding motor 506. However, it is contemplated that, in embodiments, a single motor 506 can be used to drive more than one wipe member. For example, a single motor 506 may be used to drive both the dry wipe member 312 and the purge wipe member 313. In such embodiments, the belt 507 may pass through a tensioner after engaging the first wipe member and before engaging the second wipe member.

FIG. 4D further includes an access panel 510 coupled to the overflow vessel 318. The access panel 510 enables access to the motor 506 and the belt 507, such as may be needed to adjust the tension of the belt. For example, if the dry wipe member 312 is moved in the −Z direction to reduce interference with the print head 150, the tension of the belt 507 may be adjusted to remove slack resulting from the decreased Z distance between the pulley 508 and the motor 506.

Although the embodiments described herein are shown as including a belt and pulley drive, it is contemplated that, in embodiments, other types of motors can be used. Suitable motors include, by way of example and not limitation, chain-driven motors, worm gears, or gear-to-gear motors, one or more of which may be employed. In embodiments, the dry wiper section 306 can include a first type of motor while the purge wiper section 303 can include a second, different type of motor. In embodiments, the dry wiper section 306 and the purge wiper section 303 can include the same type of motor.

To enable the dry wipe member 312 to be rotated while being mounted within the cleaning station 110, in embodiments, the shaft 509 is coupled to a bearing 512 that is received within a bearing housing 514. The bearing housing 514 is fixedly coupled to the cleaning station frame 300.

In embodiments, the dry wipe reservoir 317 is positioned vertically below the dry wipe member 312 (e.g., in the −Z direction in the FIGS.) and maintains a volume of cleaning fluid through which the dry wipe member 312 is rotated for cleaning the dry wipe member 312. As shown in FIGS. 4B and 4C, the dry wipe reservoir 317 includes at least one inlet port 520. For example, embodiments of the dry wipe reservoir 317 may include a single inlet port, two inlet ports, or three or more inlet ports. In embodiments, the inlet port 520 extends through a wall of the dry wipe reservoir 317. The dry wipe reservoir 317 is coupled to a cleaning fluid reservoir 816 (FIG. 9) through tubing or piping via the inlet port 520. Accordingly, cleaning fluid may be pumped from the cleaning fluid reservoir through the inlet port 520 and into the dry wipe reservoir 317. In FIGS. 4B and 4C, the inlet port 520 is shown as extending through a bottom wall of the dry wipe reservoir 317, although it is contemplated that, in embodiments, the inlet port 520 may extend through one of the side walls of the dry wipe reservoir 317.

The dry wipe reservoir 317 may have any suitable cross-sectional shape, provided it is sized to contain a volume of cleaning fluid and enable the wiper blades of the dry wipe member 312 to contact the cleaning fluid. For example, as shown in FIGS. 4B and 4C, the dry wipe reservoir 317 includes side walls that extend from a bottom wall at an interior angle of greater than 90°, while in FIGS. 6A and 6C, the dry wipe reservoir 317 has a rounded cross-sectional shape. Other cross-sectional shapes, including configurations having side walls that extend from the bottom wall at an interior angle of 90°, are contemplated and possible.

In addition to, or as an alternative to, the dry wipe reservoir 317, in embodiments, the dry wiper section 306 includes at least one wiper blade cleaning member 518. When included, the wiper blade cleaning member 518 removes debris from the dry wipe member 312 as the dry wipe member 312 is rotated past the wiper blade cleaning member 518 and contacts the wiper blade cleaning member 518. The wiper blade cleaning member 518 can be, by way of example and not limitation, a brush (shown in FIGS. 4B, 4C, 6B, and 6D), a wiper blade or set of wiper blades (shown in FIGS. 4D and 6A) or the like. The wiper blade cleaning member 518 can be positioned within the dry wipe reservoir 317, as shown in FIGS. 4B-4D, 5 (wiper blade cleaning member 518a in the purge wiper section 303a), and 6A, or can be positioned within the cleaning station vessel 314 independent of a dry wipe reservoir 317, as shown in FIG. 5 (the wiper blade cleaning member 518b of the dry wiper section 306a and the wiper blade cleaning member 518c of the purge wiper section 303a) and 6D.

In embodiments, such as shown in FIGS. 4B and 5, a wiper blade cleaning member 518c may be positioned between the binder purge bin 302, 302a and the purge wipe reservoir 315 to remove contaminants from the purge wipe member 313a and direct the contaminants into the binder purge bin 302, 302a. In particular, the wiper blade cleaning member 518c may be positioned on a wall of the purge wipe reservoir 315 (as shown in FIG. 4B), or the wiper blade cleaning member 518c may be positioned on a surface of the cleaning station vessel 314a (as shown in FIG. 5). When present between the binder purge bin 302, 302a and the purge wipe reservoir 315, the wiper blade cleaning member 518c can reduce the amount of contaminants that are passed into the cleaning station vessel 314, thereby reducing the amount of contaminants in the cleaning fluid that is removed from the cleaning station vessel 314. This can, for example, lead to a greater amount of recycling of the cleaning fluid, thereby reducing the need to provide fresh cleaning fluid to the additive manufacturing apparatus. For example, the decreased amounts of contaminants can improve the recyclability of the cleaning fluid, and may enable the cleaning fluid to be recirculated an increased number of times, as compared to embodiments that do not include the wiper blade cleaning member between the binder purge bin 302, 302a and the purge wipe reservoir 315.

In some embodiments, the wiper blade cleaning member 518 can be stationary, although it is contemplated that the wiper blade cleaning member 518 may, in embodiments, be configured to rotate or move in another manner. For example, the wiper blade cleaning member 518 may vibrate or move back and forth in the +/−Y or +/−Z directions, or at an angle (e.g., in the −Y/−X direction) to enhance the cleaning of the dry wipe member 312. In embodiments, two wiper blade cleaning members 518 can each be in the form of a rotating brush extending in a direction parallel to the direction of the dry wipe member 312, with one brush rotating in a clockwise direction and the other brush rotating in a counterclockwise direction, as shown in FIG. 6B. The two wiper blade cleaning members 518 can engage with one another at a location between the two wiper blade cleaning members 518, and each wiper blade cleaning member 518 can also engage with the dry wipe member 312. Accordingly, in such embodiments, each wiper blade cleaning member 518 is configured to remove contaminants and/or cleaning fluid from both of the dry wipe member 312 and the other wiper blade cleaning member 518.

In embodiments, such as shown in FIG. 6C, instead of including a separate wiper blade cleaning member 518, the dry wipe reservoir 317 may be positioned to act as a wiper blade cleaning member. For example, the dry wipe reservoir 317 may be positioned at a distance adjacent to the dry wipe member 312 such that the wiper blades 516 of the dry wipe member 312 engage with a surface of the dry wipe reservoir 317 and the dry wipe reservoir 317 scrapes the wiper blades 516 as they rotate through the dry wipe reservoir 317. Alternatively or additionally, in embodiments in which the wet cleaning member 310a is configured to rotate, as in the embodiments shown in FIGS. 5 and 6G, the wiper blades 516 of the wet cleaning member 310a can engage with the wiper blades 516 of the dry wipe member 312 to clean the wiper blades of the wet cleaning member 310a and the dry wipe member 312. In embodiments, the wet cleaning member 310a and the dry wipe member 312 rotate towards one another such that contaminants are directed down toward the cleaning station vessel 314 instead of in a direction towards the print head (not shown).

In various embodiments, the wiper blade cleaning member 518, regardless of its particular form, has a length extending in the lateral direction (e.g., +/−Y direction in the figures) that is substantially equal to a length of the dry wipe member 312 or to the wiper blades 516 of the dry wipe member 312. In embodiments, multiple wiper blade cleaning members 518 can be positioned adjacent to one another in the lateral direction along an axis extending in the lateral direction such that the sum length of the multiple wiper blade cleaning members is substantially equal to the length of the wiper blades 516 of the dry wipe member. Other configurations are contemplated, provided that substantially the entire length of the wiper blades 516 are contacted with the wipe blade cleaning member(s) 518. However, in embodiments, such as the embodiment shown in FIG. 6F, no wiper blade cleaning member is included, and the dry wipe member 312 is cleaned using a flow of cleaning fluid through the dry wipe reservoir 317.

In still other embodiments, a sprayer 522 can be included, as shown in FIG. 6E. For example, the sprayer 522 can spray cleaning fluid onto the dry wipe member 312 as it is rotated. In embodiments, an elongated sprayer extending along the length of the dry wipe member 312 can be mounted to the dry wipe reservoir 317 or to the cleaning station vessel 314, or a series of sprayers can be mounted to the dry wipe reservoir 317 or to the cleaning station vessel 314. In such embodiments, the dry wipe reservoir 317 may not receive a flow of cleaning fluid. Alternatively, when a sprayer 522 is included, the dry wipe reservoir 317 may be omitted from the dry wiper section 306, as shown in FIG. 6E.

As yet another alternative, in embodiments, cleaning fluid can be applied between the wiper blades 516 and the dry wipe member 312 can be vibrated, oscillated, or otherwise moved in one or more directions to agitate the cleaning fluid between the wiper blades 516. In embodiments, the dry wipe member 312 can be "rocked" or slightly rotated to cause the cleaning fluid to spill over one of the wiper blades 516 and flow over the surface of the dry wipe member 312 to clean the wiper blades 516 and the dry wipe member 312. The cleaning fluid can be applied, for example, using a sprayer or through a cleaning manifold extending through the dry wipe member 312 (not shown), such as the cleaning manifold 414 described above and below with respect to the wet cleaning member 310.

It should be appreciated that, in embodiments, one or more features of the dry wiper section 306, and accordingly, the purge wiper section 303, described hereinabove can be combined with other features of the dry wiper section 306, and accordingly, the purge wiper section 303. Moreover, it should be appreciated that the purge wiper section 303 can be identical to or different from the dry wiper section 306, depending on the particular embodiment.

Cleaning Station—Wet Cleaner Section

Figure 7A:
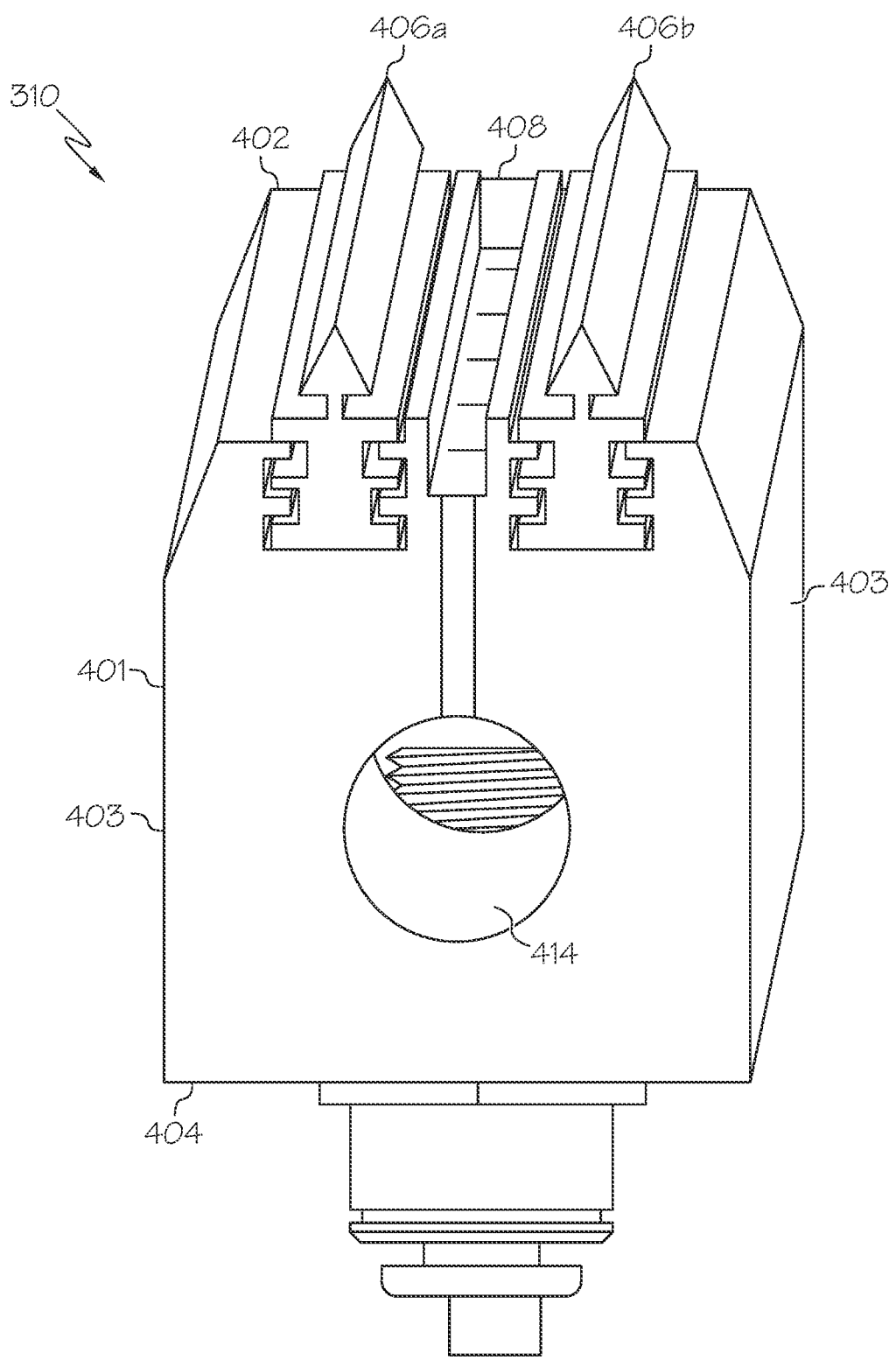
FIG. 7A is a schematic perspective view of a wet cleaning member including two blades in a wet wipe cleaning section of an additive manufacturing apparatus according to one or more embodiments shown and described herein.
Figure 7B:
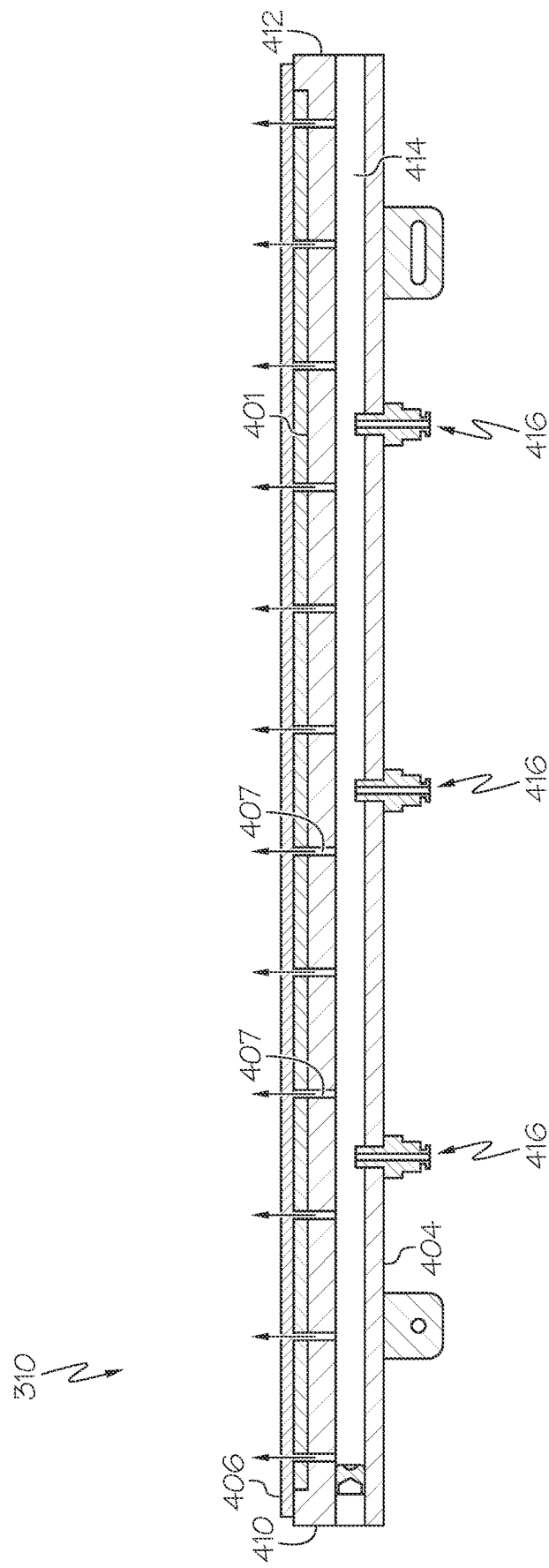
FIG. 7B is a cross-sectional front view of a wet cleaning member in a wet cleaning section of an additive manufacturing apparatus according to one or more embodiments shown and described herein.

Various suitable embodiments are contemplated for the wet cleaner section 304. As shown in FIGS. 7A and 7B, the wet cleaner section 304 comprises a wet cleaning member 310. The wet cleaning member 310 comprises any suitable mechanism for passively applying cleaning fluid to a print head, for example, a brush, a squeegee, and the like. As used herein, "passively applying" means the wet cleaning member 310, or the cleaning fluid provided by the wet cleaning member 310, contacts the print head as it traverses the wet cleaner section 304. As described hereinabove, in embodiments, the wet cleaning member 310 is a stationary cleaning member that provides a volume of cleaning fluid to the face of the print head as the print head traverses the wet cleaner section 304. However, in embodiments, such as the embodiments shown in FIGS. 5 and 6G, the wet cleaning member 310 can rotate in a manner similar to that described above with respect to the dry wipe member 312.

Referring now to FIGS. 7A-7E, additional embodiments of the wet cleaner section 304 are schematically depicted. Specifically as shown in FIGS. 7A-7E, a wet cleaning member 310 for applying cleaning fluid to the print head 150 is depicted. The wet cleaning member 310 includes a wet cleaning body 401 having a top side 402 and a bottom side 404. In embodiments, the wet cleaning member 310 includes at least one wiper blade 406 vertically extending from the top side 402 of the wet cleaning body 401. In the embodiment shown in FIGS. 7A and 7B, the wet cleaning member 310 includes a first wiper blade 406a and a second wiper blade 406b (collectively, the wiper blades 406), spaced apart from one another. In the embodiment shown in FIG. 7C, the wet cleaning member 310 includes a single wiper blade 406. Accordingly, any number wiper blades may be included in the wet cleaning member 310.

Figure 7C:
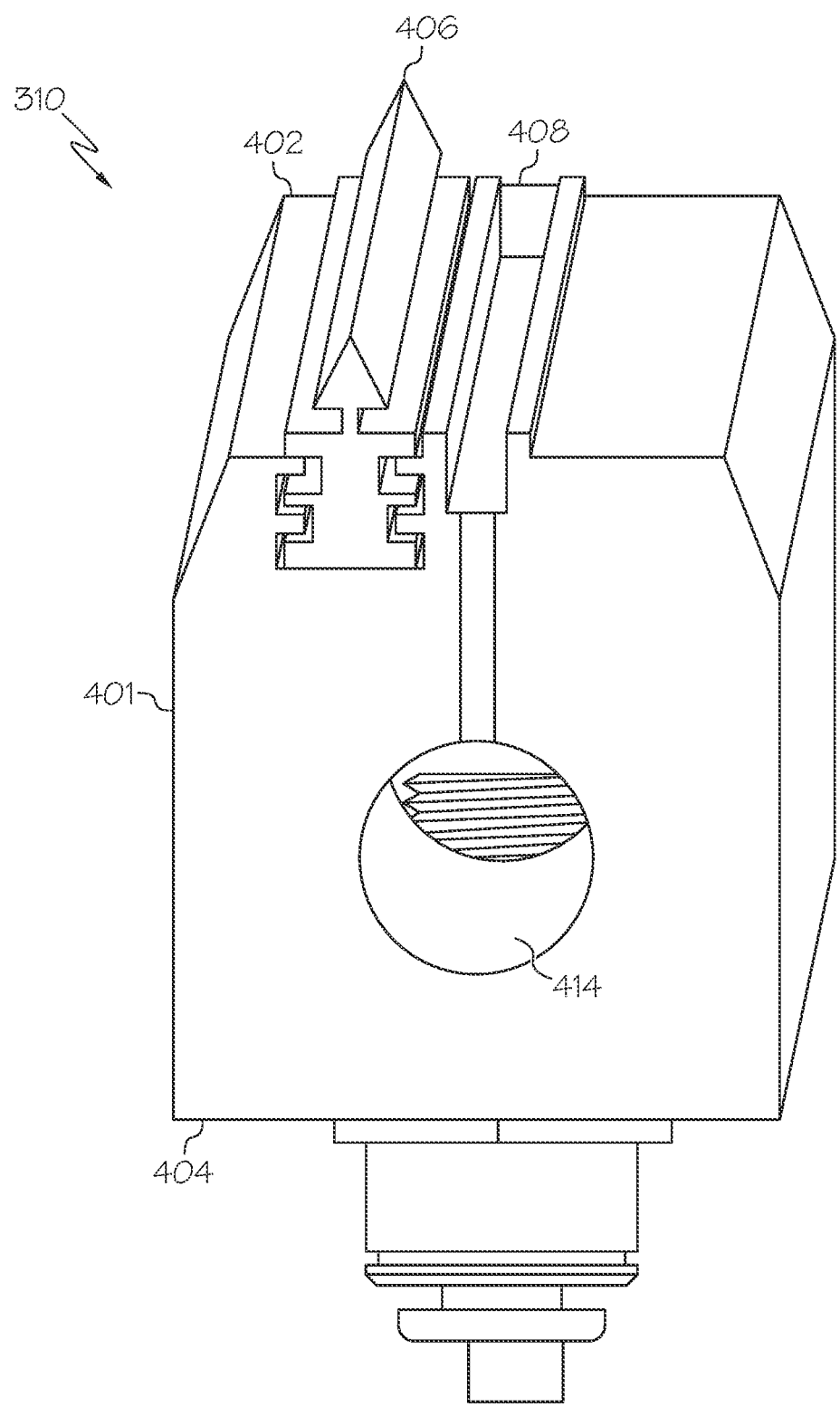
FIG. 7C is a schematic perspective view of a wet cleaning member including a single blade in a wet cleaning section of an additive manufacturing apparatus according to one or more embodiments shown and described herein.
Figure 7D:
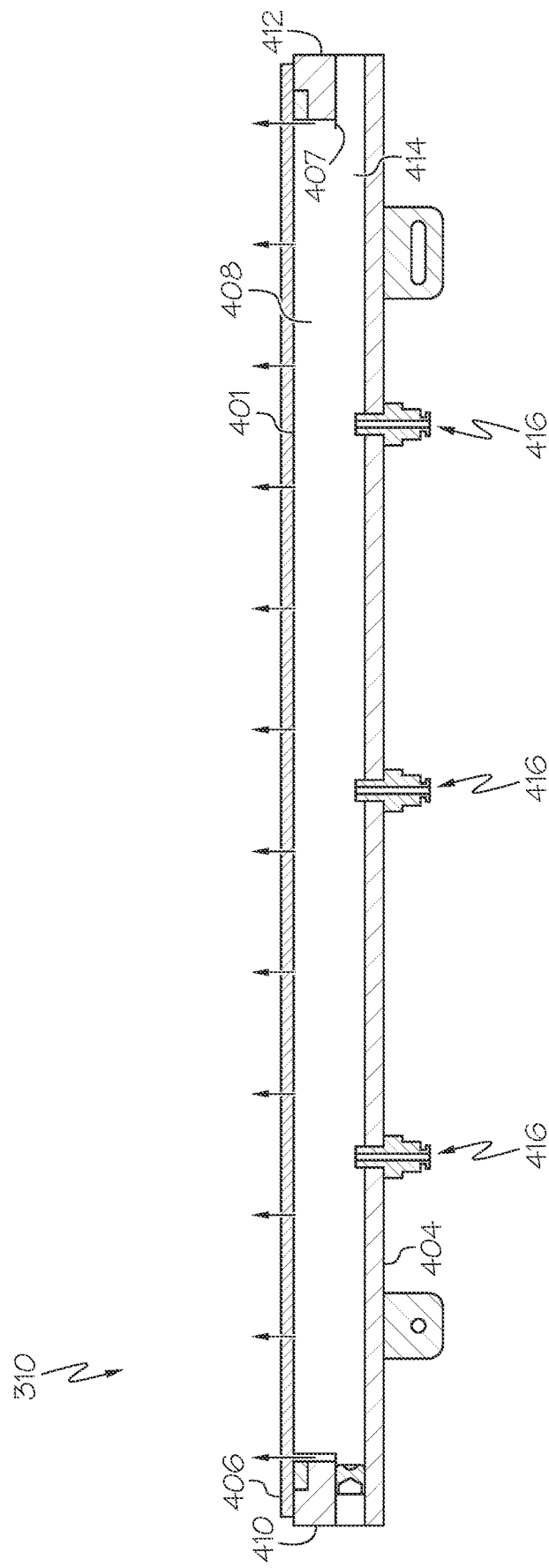
FIG. 7D is a cross-sectional front view of a wet cleaning member in a wet cleaning section of an additive manufacturing apparatus according to one or more embodiments shown and described herein.
Figure 7E:
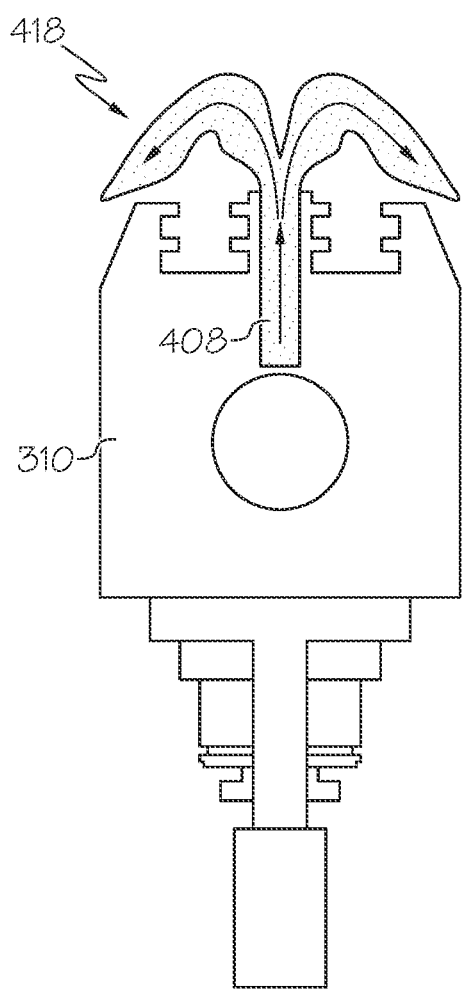
FIG. 7E is a cross-sectional side view of a blade-less wet cleaning member in a wet cleaning section of an additive manufacturing apparatus according to one or more embodiments shown and described herein.

Although the wet cleaning member 310 is described in various embodiments as including at least one wiper blade 406, in embodiments, the wet cleaning member 310 does not include wiper blades, as shown in FIG. 7E.

A fluid channel 408 extends horizontally from a first end 410 of the wet cleaning body 401 to a second end 412 of the wet cleaning body 401, as shown in FIGS. 7A-7C, and defines a recessed path within the wet cleaning body 401. The fluid channel 408 has an open top to allow cleaning fluid to flow out of the fluid channel 408. The rate of the flow of the cleaning fluid through the fluid channel 408 is controlled in embodiments, thereby enabling control of the height of a fluid wall 418 created by the cleaning fluid, shown in FIG. 7E. In embodiments, such as the embodiment shown in FIGS. 7A and 7B, the fluid channel 408 is positioned between the first wiper blade 406a and the second wiper blade 406b. Although the wiper blades 406 and the fluid channel 408 are described herein as extending from a first end 410 to the second end 412 of the wet cleaning body 401, in embodiments, the wet cleaning body 401 has a length from the first end 410 to the second end 412 that is greater than a length of the wiper blades 406 and/or the fluid channel 408. For example, in embodiments, the wiper blades 406 and/or the fluid channel 408 may be positioned within the wet cleaning body 401 with the wet cleaning body 401 extending about 1 mm, about 2 mm, about 5 mm, or about 10 mm on each end. This additional length of the wet cleaning body 401 can enable, for example, the wet cleaning body 401 to extend from end to end of the cleaning station while the wiper blades 406 and/or the fluid channel 408 are sized to have substantially the same length as the print head.

As shown in FIG. 7E, in embodiments in which the wet cleaning member 310 does not include wiper blades 406, the flow of the cleaning fluid through the fluid channel 408 is controlled to provide a touchless wiping system that uses the fluid wall 418 to wipe contaminants from the print head without requiring the use of wiper blades. Moreover, it is contemplated that, in some embodiments, the wet cleaning member 310 may include wiper blades 406, but the wiper blades 406 do not contact the print head during the cleaning. For example, the wiper blades 406, in embodiments, may serve to direct and control the cleaning fluid that is applied to the print head.

Figure 7F:
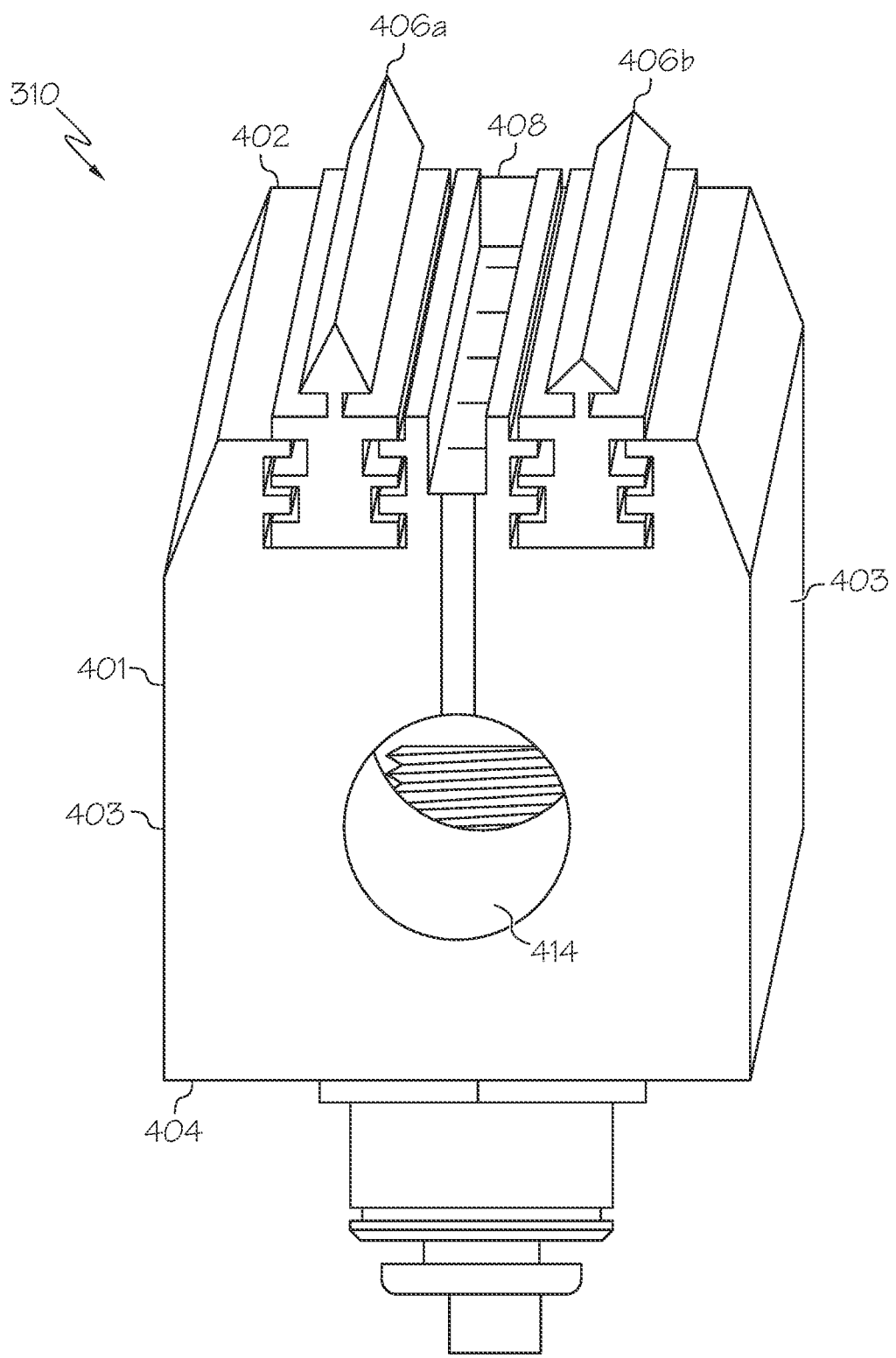
FIG. 7F is a cross-sectional side view of a wet cleaning member including two blades having different vertical positions in a wet cleaning section of an additive manufacturing apparatus according to one or more embodiments shown and described herein.

In embodiments, each of the wiper blades 406a has the same vertical (e.g., +/−Z) position as the other blades 406b, as shown in FIG. 7A. Accordingly, all of the wiper blades 406a, 406b has the same engagement distance with the print head 150 during wiping operations. As is known in the art, the "engagement distance" refers to the amount by which the vertical position of the print head 150 and the vertical position of an undeflected wiper blade 406 overlap. However, in embodiments, one or more wiper blades 406a are positioned at a first vertical position while one or more wiper blades 406b are positioned at a second vertical position, as shown in FIG. 7F. In such embodiments, a least one wiper blade 406a has a different engagement distance than the wiper blades 406b. For example, the wiper blades 406 may be positioned such that the engagement distance with the print head 150 increases along the path of the print head 150 during the wet cleaning process.

As shown in FIGS. 7A-7C, the wet cleaning member 310 further includes a cleaning manifold 414 that extends below the fluid channel 408 within the wet cleaning body 401. The cleaning manifold 414 is in fluid communication with the fluid channel 408 through at least one fluid port 407 to provide cleaning fluid from the cleaning manifold 414 to the top side 402 of the wet cleaning body 401, e.g., via the fluid channel 408. In the embodiment shown in FIG. 7B, twelve fluid ports 407 provide cleaning fluid from the cleaning manifold 414 to the fluid channel 408. Each fluid port 407 may have a circular cross-section, a square cross-section, or other cross-section suitable for fluid flow. However, in the embodiment shown in FIG. 7D, one fluid port 407 provides cleaning fluid from the cleaning manifold 414 to the fluid channel 408. The fluid port 407 in FIG. 7D extends from the first end 410 to the second end 412 of the wet cleaning body 401 and has a substantially rectangular cross-section. Other shapes, sizes, and quantities of fluid ports are possible and contemplated. In embodiments, such as the embodiment shown in FIG. 7B where the fluid channel 408 is positioned between first and second wiper blades 406, the fluid port 407 is also disposed between the first and second wiper blades 406.

In various embodiments, the cleaning fluid is provided to the cleaning manifold 414 through a plurality of cleaning fluid inlets 416 that are fluidly coupled to a cleaning fluid reservoir or cleaning fluid management system, described in greater detail below. The plurality of cleaning fluid inlets 416 may be, for example, fluid conduits that extend vertically upward through the bottom side 404 of the wet cleaning body 401. However, in embodiments, the plurality of cleaning fluid inlets 416 additionally or alternatively extend from a side 403 of the wet cleaning body 401 adjacent to the top side 402 and the bottom side 404 of the wet cleaning body 401. The plurality of cleaning fluid inlets 416 are operable to receive the cleaning fluid and provide the cleaning fluid to the cleaning manifold 414. The cleaning fluid inlets 416 are in fluid communication with the fluid port 407 through the cleaning manifold 414 such that cleaning fluid enters the cleaning manifold 414 through the cleaning fluid inlets 416 and exits the cleaning manifold 414 through the fluid port 407.

In some embodiments, a baffle (not shown) is positioned within the fluid channel 408. The baffle can include one or more apertures or pores through which the cleaning fluid flows after entering the fluid channel 408 from the fluid port(s) 407. When included, the baffle can facilitate equilibration of the flow of the cleaning fluid along the length of the fluid channel 408, such that a depth of the fluid along the length of the fluid channel 408 is substantially constant. Moreover, in embodiments, the baffle can reduce fluctuations in the height of a fluid wall created by the cleaning fluid flowing through the fluid port(s) 407.

Accordingly, in embodiments, the cleaning fluid is fed through the wet cleaning member 310 continuously during operation of the additive manufacturing apparatus. After the wet wipe member applies liquid to the print head, the liquid then overflows back into the cleaning station vessel 314. As described more below, within the cleaning station vessel 314, there is a drain 320 (see FIG. 4C), which directs cleaning fluid into a cleaning fluid reservoir 816 (see FIG. 9), and is then pumped back into the wet cleaning member 310. The continuous cleaner circulation and recirculation is described more below. In embodiments, the rate of the flow of the cleaning fluid through the fluid channel 408 is controlled in embodiments, thereby enabling control of the height of a fluid wall 418 created by the cleaning fluid, shown in FIG. 7E. For example, the height of the fluid wall 418 may be increased to apply cleaning fluid to the print head, and decreased when the print head is not over the wet cleaner section 304, or when the cleaning fluid should not be applied to the print head passing over the wet cleaner section 304.

Accordingly, in embodiments, when the wet cleaning member 310 is activated, cleaning fluid is supplied to the print head 150 to dissolve contaminants. While the cleaning fluid may dissolve the contaminants in some cases, the contaminants may also be considered as mixed or suspended within the cleaning fluid. The cleaning manifold 414 and the fluid channel 408 ensure that cleaning fluid can be directly applied to the print head 150 during cleaning while compensating for any delay that may result from the use of pumps in the fluid management system, as will be discussed in greater detail below. In particular, the cleaning manifold 414 and the fluid channel 408 provide a local reservoir of cleaning fluid that can be used even when the pumps are not actively providing cleaning fluid to the wet cleaning member 310.

In the embodiment depicted in FIG. 7A, the cleaning fluid does not flow to the top of the wiper blades 406. However, it is contemplated that in other embodiments, a pair of walls extends between the first wiper blade 406a and the second wiper blade 406b from the top side 402 of the wet cleaning body 401 to a top of each of the first wiper blade 406a and the second wiper blade 406b. The pair of walls thus extends the depth of the fluid channel 408 to the top of the wiper blades 406, enabling the cleaning fluid to fill up to the top of the wiper blades 406. Such embodiments may enable greater dissolution of contaminants on the print head 150 and greater control of the cleaning fluid between the wiper blades 406.

In further embodiments, the dry wipe member 312 may be rotated such that the dry wipe member 312 the wiper blades that will contact the print head are rotated out of the volume of the cleaning fluid with sufficient time to allow the cleaning fluid to drain away from the dry wiper blades 516. The dry wipe member 312 contacts the print head 150 as it is moved through the dry wiper section 306 to remove cleaning fluid, contaminants and other debris from the print head 150 after the print head 150 is cleaned by the wet cleaning member 310.

Cleaning Station—Capping Section

As described with reference to FIGS. 4A-4C, in various embodiments, the cleaning station 110 includes a capping section 308 including a cover 701 to create or maintain a non-curing environment around the print head 150. As used herein, a "non-curing environment" means an environment in which the binder material does not cure within or on the surface of the nozzles of the print head 150. The non-curing environment may be maintained, for example, by maintaining a particular humidity level, temperature, or the like, that prevents the binder material from curing. Various suitable embodiments are contemplated.

Figure 8:
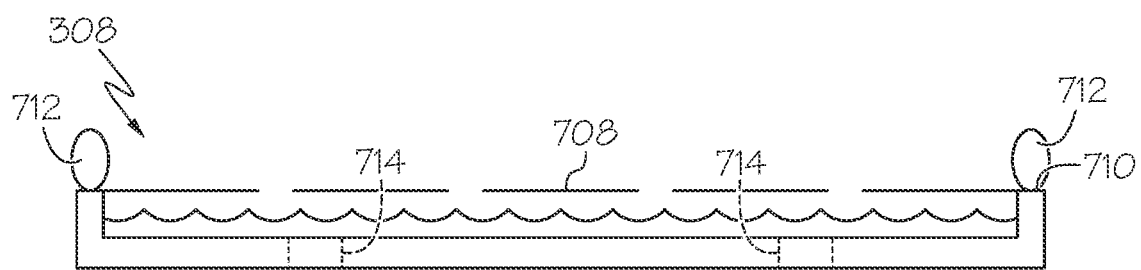
FIG. 8 is a cross-sectional side view of a capping section of the cleaning station including a cap according to one or more embodiments shown and described herein.

An example embodiment of a capping section 308 is shown in greater detail in FIG. 8. In particular, the capping section 308 includes a cap 710. In embodiments, the cap 710 may be sealed around the print head 150 (not shown in FIG. 8) when the print head 150 is idle to prevent the evaporation of binder material from the nozzles of the print head 150, to maintain a humidity level around the print head 150, and/or to maintain or create a non-curing environment around the print head 150. As shown in FIG. 8, in embodiments, the cap 710 may include a volume of cleaning fluid so as to create a humid, non-curing environment around the nozzles of the print head 150, although in some embodiments, the cap 710 may not include a volume of fluids.

In embodiments, the cap 710 is coupled to an optional actuator (not shown) that is operable to raise and lower the cap 710 within the cleaning fluid. The actuator may be a linear actuator, a rotary actuator, a pneumatic actuator, an electric actuator, or any other suitable type of actuator selected based on the particular embodiment. In some embodiments, the actuator may be coupled to a passive resistance mechanism (not shown), which biases the cap 710 toward a raised position such that at least a portion of the cap 710 able to contact the print head 150. The passive resistance mechanism may be, by way of example and not limitation, a spring biased in an upward direction. The incorporation of a passive resistance mechanism, though optional, serves as a fail-safe to ensure that, in the event of an actuator failure, the cap 710 is positioned for use to maintain the print head 150 in a non-curing environment. Additionally or alternatively, the incorporation of the passive resistance mechanism may enable energy savings by enabling power to the actuator to be reduced or turned off while the print head 150 is idle without causing the cap 710 to be retracted.

In embodiments including an actuator, the actuator enables the height of the cap 710 to be adjusted relative to the print head 150. Accordingly, the cap 710 may be positioned to contact the print head 150 with fluid contained within the cap 710, or the cap 710 may be positioned to cap the print head 150 such that the face of the print head 150 is not contacted by the fluid. In embodiments in which the actuator is not included, the cap 710 may be positioned at a predetermined Z location with respect to the print head 150. The predetermined Z location may be selected to be a location that is within a specific distance from the face of the print head 150 to maintain a non-curing environment around the print head 150.

In embodiments, the cap 710 may further include one or more gaskets or seals 712 to create a seal between the cap 710 and the print head 150 when the cap 710 is in use. In some embodiments, the seals 712 may be inflatable seals that are inflated when the print head 150 is present in the capping section 308. Accordingly, in such embodiments, the seals 712 are deflated to enable the print head 150 to move into and out of the capping section 308 without contacting the seals 712, and are inflated when the print head 150 is in position within the capping section 308 to seal up against a surface of the print head 150 (e.g., the base plate of the print head 150) to maintain a non-curing environment. The creation of a seal may minimize or even eliminate evaporation of cleaning fluid in the cap 710, the binder material in the print head 150, or both. However, in other embodiments, the seals 712 may not be inflatable or may not be inflated to contact the print head 150, and the cap 710 can provide a vented, non-curing environment around the face of the print head 150.

In embodiments, the cap 710 may include one or more ports 714 (e.g., inlet and outlet ports) to enable cleaning fluid to be flowed through the cap 710 during use. Although depicted in FIG. 8 as being located in a bottom surface of the cap 710, in embodiments, one or more of the ports 714 can be positioned in a side wall of the cap 710. Moreover, in embodiments, cleaning fluid can be supplied to the cap 710 through the ports 714, and may exit the cap 710 by flowing over one or more sides (and, in embodiments, seals 712) of the cap 710. In embodiments, the cap 710 is provided with cleaning fluid when the cap 710 is in use, but does not maintain a volume of cleaning fluid when the cap 710 is not in use. It is contemplated that, in some embodiments, the flow of the cleaning fluid into and/or out of the cap 710 can be regulated (e.g., through the use of a throttling valve or the like), thereby enabling a level of the cleaning fluid within the cap 710 to be controlled and/or adjusted.

In the embodiment shown in FIG. 8, the cap 710 further includes a baffle 708. Although optional, the baffle 708 distributes the flow of the cleaning fluid entering the cap 710, thereby enabling the cleaning fluid to be flowed into the cap 710 without contacting the print head 150. For example, when the cleaning fluid is flowed into the cap 710 at a quick rate, it may have an increased fluid level directly above the ports 714, which may contact the face of the print head at those locations. However, the baffle 708 can redistribute the cleaning fluid over the cap 710 such that the fluid level is substantially constant over the area of the cap 710, preventing any areas of increased fluid level, and preventing the cleaning fluid from contacting the print head 150.

Cleaning Station—Motion of Components

As has been described herein, various components of the cleaning station 110, including the dry wipe member 312, the purge wipe member 313 and, in some embodiments, the wet cleaning member 310a, are configured to rotate about an axis extending in the lateral (e.g., +/−Y) direction during the cleaning of the print head 150. Although described herein with reference only to the rotational component of the movement, it is contemplated that, in embodiments, the motion of the various components may have motion in other directions in addition to the rotational direction. For example, the components may be moved in a rotational and vertical motion.

In general, the various components of the cleaning station 110 each independently moves between a contact position, in which the component is positioned to engage with or clean the print head 150, and a non-contact position, in which the component is rotated to avoid engaging with the print head 150. For example, in embodiments, and with reference to FIG. 4A, the print head 150 enters the cleaning station 110 from the right hand side of the figure, passing over the spit capture tray 307 first. In embodiments, as the print head 150 proceeds from right to left, the capping section 308, the wet cleaning member 310, the dry wipe member 312, and the purge wipe member 313 are in the non-contact position such that they do not contact or clean the print head 150. For example, the dry wipe member 312 and the purge wipe member 313 are rotated such that wiper blades 516 are not extending upwards from the dry wipe member 312 or the purge wipe member 313, respectively, in a substantially vertical direction. The print head 150 arrives at the binder purge bin 302, where backpressure is applied to the print head 150 to discharge contaminants from the print head 150 into the binder purge bin 302. In embodiments, during an additive manufacturing process, the print head 150 discharges contaminants into the binder purge bin 302 while the recoat head 140 is moving in the −X direction (e.g., a forward direction) in FIG. 1, supplying build material to a working surface of the build platform 120. The print head 150 then moves to the right, where the print head 150 is introduced to the purge wipe member 313. The purge wipe member 313 is in a contact position with one or more wiper blades 516 extending upwards vertically from the purge wipe member 313, as shown in FIGS. 4A-4C. Contaminants from the face of the print head 150 are scraped by the purge wipe member 313, which directs the contaminants into the binder purge bin 302 as the purge wipe member 313 is rotated in the counterclockwise direction.

The print head 150 then moves again to the right, where the print head 150 is introduced to the wet cleaning member 310. The wet cleaning member 310 is in a contact position to apply cleaning fluid to the print head 150. In embodiments, the "contact position" of the wet cleaning member 310 is a configuration in which a flow of the cleaning fluid into the fluid channel 408 is increased such that a fluid wall having a height sufficient to contact the print head 150 is established.

Next, the print head 150 is introduced to the dry wipe member 312, which has moved to an contact position to wipe excess cleaning fluid from the print head 150, as described herein. In embodiments, the purge wipe member 313 and/or the dry wipe member 312 are rotated such that the wiper blades that will contact the print head 150 are rotated out of the cleaning fluid (e.g., cleaning fluid in the purge wipe reservoir 315 or the dry wipe reservoir 317) before the completion of the discharge of the contaminants from the print head 150 over the binder purge bin 302. The purge wipe member 313 and/or the dry wipe member 312 are rotated such that the wiper blades that contacted the print head 150 are no longer in a contact position (e.g., in an upright vertical position) after the print head 150 proceeds past them. In embodiments, during an additive manufacturing process, the purge wiping, wet cleaning, and dry wiping steps performed by the purge wipe member 313, the wet cleaning member 310 and the dry wipe member 312, respectively, are performed while the recoat head 140 is moving in the +X direction (e.g., a reverse direction) from the build platform 120 toward a recoat home position 148.

After being wiped, the print head 150 may be capped in the capping section 308, or it may proceed to the spit capture tray 307, where it is prepared for printing. For example, back pressure may be applied to the print head 150 to equilibrate the print head 150 for printing. In embodiments, the print head 150 then returns to the build platform 120 to deposit binder material onto the powder layer, as described with respect to FIG. 1.

Alternative orders in the operations of the components of the cleaning station 110 are contemplated. For example, in embodiments, the print head 150 enters the cleaning station 110 from the right hand side of the figure, passing over the spit capture tray 307 first. However, as the print head 150 proceeds from right to left, the wet cleaning member 310, the dry wipe member 312, or the wet cleaning member 310 and the dry wipe member 312 are in the contact position such that they contact the print head 150 along its path to the binder purge bin 302. In such embodiments, this can be a pre-cleaning step to remove surface contaminants prior to the discharging of additional contaminants over the binder purge bin 302.

Moreover, in some embodiments, the print head 150 may include features to control and/or direct cleaning fluid within the cleaning station 110, such as cleaning fluid that is wiped from the print head 150 by the dry wipe member 312. For example, as the print head 150 proceeds through the cleaning station 110, cleaning fluid is applied to the face of the print head by the wet cleaning member 310. The print head 150 then proceeds to the dry wiper section 306, where the dry wipe member 312 contacts the face of the print head 150 to remove excess cleaning fluid from the face of the print head 150. Engagement of the wiper blades 516 of the dry wipe member 312 with the face of the print head 150 causes the wiper blades 516 to bend and, as the print head 150 passes the wiper blades 516, the disengagement of the wiper blades 516 from the face of the print head 150 allows the wiper blades 516 to spring back to their original position. However, this springing back can cause the cleaning fluid on the wiper blades 516 to be ejected from the wiper blades 516. If left unmanaged, the cleaning fluid can, for example, be ejected upward into the print head 150. Accordingly, in embodiments, the print head 150 includes a deflector plate 1348, as shown in FIGS. 10 and 11.

The deflector plate 1348 is provided proximate a print home side wall 1204 of a housing 1201 of the print head 150. The deflector plate 1348 includes a body 1350 having a front end 1352, a rear end 1354, and a pair of sides 1356, 1358. In embodiments, each side 1356, 1358 of the body 1350 extends past the front end 1352 and includes a flange 1360 extending perpendicular to the body 1350 of the deflector plate 1348. In embodiments, each flange 1360 receives a fastener 1362 engaging a printing head within the print head 150, such as the end walls 1208, 1210 of the printing head to secure the deflector plate 1348 thereto. The fastener 1362 can be, as a non-limiting example, a screw, bolt, rivet, or the like.

In embodiments, the deflector plate 1348 is secured to a base plate 1202 of the printing head 1154 such that the deflector plate 1348 moves in unison with the print heads 1156 as the print heads 1156 are operated to index between end walls 1208, 1210 of the housing 1201. In this embodiment, the deflector plate 1348 has a width at least as great as a width of the base plate 1202 of the printing head to ensure that no cleaning solution accumulates on the base plate 1202. In embodiments, the deflector plate 1348 is fixed to the housing 1201 (e.g., to the end walls 1208, 1210 of the housing 1201) so that the deflector plate 1348 does not move in unison with the print heads 1156 as the print heads 1156 index between the end walls 1208, 1210 of the housing 1201. Rather, the deflector plate 1348 is fixed. In this embodiment, the width of the deflector plate 1348 is greater than the width of the base plate 1202 of the printing head and extends between opposite end walls 1208, 1210 of the housing 1201.

The deflector plate 1348 is dimensioned to provide a smooth transition from the first surface 1344 of the base plate 1202 of the printing head to a bottom surface 1364 of the deflector plate 1348 to prevent cleaning fluid from flowing onto the printing head. Additionally, the rear end 1354 and the sides 1356, 1358 of the deflector plate 1348 are curved to prevent the cleaning fluid from accumulating thereon and providing a smooth transition to the printing head. In embodiments, the rear end 1354 extends past the base plate 1202 and/or the housing 1201 to prevent cleaning fluid from accumulating on the print head 150. More specifically, the deflector plate 1348 operates as a "flick plate" due to the curved rear end 1354 to deflect or flick cleaning fluid away from the print head 150 as the dry wipe member 312 moves across the print head 150 and out of contact with the bottom surface 1364 of the deflector plate 1348.

In embodiments, the deflector plate 1348 may be formed of polyetherimide, such as those commercially available under the trademark ULTEM™ (SABIC Innovative Plastics), which provides ease of fabrication and a high resistance to chemicals. In embodiments, the deflector plate 1348 may be formed of a metal such as, for example, aluminum. When the deflector plate 1348 is formed of metal, the deflector plate 1348 may also be coated with electroless nickel with co-deposited PTFE to provide wear resistance and a low coefficient of friction. As shown in FIG. 11, a seal 1355 may be provided at an interface between the deflector plate 1348 and the base plate 1202. Although only illustrated at the rear end 1354 of the deflector plate 1348, the seal 1355 may extend along an interior perimeter of the deflector plate 1348.

In embodiments, the deflector plate 1348 includes an outer layer 1366 attached to an underside of the body 1350 of the deflector plate 1348. In embodiments, the outer layer 1366 has a surface roughness of equal to or less than 200 Ra (Roughness average). In embodiments, the outer layer 1366 has a surface roughness of equal to or less than 125 Ra (Roughness average). In embodiments, the outer layer 1366 has a surface roughness of equal to or less than 75 Ra (Roughness average). The outer layer 1366 of the deflector plate 1348 lies in the same plane as a first surface 1344 of the base plate 1202 such that the deflector plate 1348 is flush with the base plate 1202. The outer layer 1366 may be formed of an absorbent material for absorbing cleaning fluid. The outer layer 1366 may be secured to the surface of the body 1350 of the deflector plate 1348 using any suitable attachment means such as, for example, fasteners, an adhesive, welded, or the like. In instances in which the outer layer 1366 is removable from the body 1350 of the deflector plate 1348, the outer layer 1366 may be replaced when it no longer provides adequate absorption of the cleaning fluid. It should be appreciated that the entire deflector plate 1348 may be removed from the printing head 1154 by removing the fasteners at the flanges 1360 so that the deflector plate 1348 may be repaired or to replace the deflector plate 1348 with a replacement deflector plate. As described herein, the deflector plate 1348 prevents defects from forming in the build platform 120 by cleaning fluid dropping onto the build platform 120 from the print head 150, thereby improving the quality of the object being built. Moreover, as described hereinabove, the deflector plate 1348 provides an interface that maintains contact between the print head 150 and the wiper blades 516 of the dry wipe member 312 such that the wiper blades 516 are disengaged from the print head 150 at a time and location with respect to the print head 150 such that cleaning fluid ejected from the wiper blades 516 is not deposited on or within the print head 150.

Having described various sections of a cleaning station 110, a fluid management system suitable for providing cleaning fluid to the cleaning station 110 and binder material to the print head 150 will now be described in detail.

Fluid Management System

Referring now to FIG. 9 in conjunction with FIG. 1, a fluid management system 900 includes a binder material pathway for providing binder material 500 to a print head 150 and for recycling binder material 500 not deposited on build material 400 positioned on the build platform 120 and a cleaning fluid pathway for providing cleaning fluid to the cleaning station 110 for cleaning the print head 150 between depositing operations and recycling and reconditioning cleaning fluid to minimize the amount of cleaning fluid that is wasted.

In general, the binder material pathway includes a binder reservoir 802 that is in fluid communication with the print head 150 and the binder purge bin 302. The binder purge bin 302 may include an active drain 806, which allows binder flow from the binder purge bin 302 into the binder reservoir 802. Further, as shown, the binder purge bin 302 may include an overflow drain 812 disposed on the sidewall of the binder purge bin 302, which releases binder from the binder purge bin 302 if a level of binder in the binder purge bin 302 exceeds a desired binder fluid level. In some embodiments, level sensors may be included to ensure binder fluid level is properly monitored and maintained.

Referring again to FIG. 9, the binder material pathway enables recirculation of the binder material to reduce or even eliminate clogging of the binder material in the nozzles of the print head 150.

The binder material is provided from the binder reservoir 802 to an ink delivery system 804 which in turn delivers the binder material to the print head 150. The ink delivery system 804 enables the separation of storage of the binder material from the print head 150 and allows for the binder material to be replaced or refilled while the additive manufacturing apparatus 100 is actively printing. The print head 150 discharges the binder material through nozzles into, for example, the build area and the binder purge bin 302.

Binder material discharged into the binder purge bin 302 passes through an active drain 806. In the embodiment depicted in FIG. 9, the active drain 806 is located at or near a bottom of the binder purge bin 302, to enable the binder material to be recirculated without requiring the accumulation of the binder material in the binder purge bin 302. In embodiments, the active drain 806 is in fluid communication with a pump 808 that actively moves the binder material from the active drain 806 through a filter 810 and back to the binder reservoir 802. The filter 810 may remove contaminants or large particles, such as polymers that have agglomerated as a result of partial evaporation of the binder material and build material particles, to ensure that the binder material that is returned to the binder reservoir 802 is suitable for recirculation through the binder material pathway.

As shown in FIG. 9, the binder purge bin 302 further includes an overflow drain 812 located through a sidewall of the binder purge bin 302. In embodiments, the overflow drain 812 is located within the top half of the height of the sidewall of the binder purge bin 302. The overflow drain 812 is in fluid communication with a waste reservoir 814. In embodiments, the overflow drain 812 may be a passive drain. Accordingly, in the event that the active drain 806 becomes clogged or binder material otherwise accumulates to a level greater than or equal to the position of the overflow drain 812, the binder material can be drained from the binder purge bin 302 and removed from the binder material pathway via the waste reservoir 814. In the event of a clog in the active drain 806, the binder material removed from the binder purge bin 302 is directed from the overflow drain 812 to the waste reservoir 814 so as to minimize the amount of contaminants recirculated through the system, although in some embodiments, it is contemplated that the overflow drain 812 may be in fluid communication with the binder reservoir 802, such as through the filter 810.

In embodiments, the overflow drain 812 is coupled to the binder reservoir 802 and the waste reservoir 814 through a valve 815, although other pathways are contemplated. Valve 815 can be, for example, a pinch valve, a three-way valve, or a four-way valve, although other types of valves are contemplated. It is further contemplated that the overflow drain 812 can be fluidly coupled to another part of the main circulation path instead of being fluidly coupled to the binder reservoir 802.

In embodiments including the valve 815, binder material overflowing from the binder purge bin 302 flows through the overflow drain 812. Binder material flowing through the overflow drain 812 is evaluated and, if verified that the binder material flowing through the overflow drain 812 is still usable, the binder material is returned to the binder reservoir 802. If, however, the binder material in the overflow vessel 318 is not still suitable for use (e.g., it contains too many contaminants or does not otherwise meet specifications for use), the binder material is sent to the waste reservoir 814. In embodiments including the valve 815, the valve 815 can be controlled by a computing device, such as control system 200 that is configured to verify the suitability of the binder material for use and send a signal to the valve 815 to direct the binder material to the binder reservoir 802 or the waste reservoir 814.

Turning now to the cleaning fluid pathway depicted in FIG. 9, the cleaning fluid pathway generally includes a cleaning fluid reservoir 816 that is in fluid communication with the purge wipe reservoir 315, the wet cleaning member 310, the dry wipe reservoir 317, the spit capture tray 307, and the capping section 308 of the cleaning station 110. The cleaning fluid pathway enables cleaning fluid to be applied to the print head 150 to fluidize particles deposited on the print head 150, such as build material particles and binder material particles, while further enabling the cleaning fluid to be recirculated and reconditioned to reduce the amount of cleaning fluid that is wasted.

In embodiments, the cleaning fluid is provided from the cleaning fluid reservoir 816 to a pump 820, which in turn delivers the cleaning fluid to the purge wipe reservoir 315, the wet cleaning member 310, the dry wipe reservoir 317, the cap 710, and the spit capture tray 307 through corresponding fluid inlets (not shown in FIG. 9). In particular, the pump 820 delivers the cleaning fluid to the purge wipe reservoir 315 and the dry wipe reservoir through corresponding inlet ports 520, to the wet cleaning member 310 through the cleaning fluid inlets 416, to the cap 710 through the ports 714 (FIG. 8), and to the spit capture tray 307 through fluid inlets 309. Although in the embodiment shown in FIG. 9, a single pump 820 is shown as pumping the cleaning fluid to the purge wipe reservoir 315, the wet cleaning member 310, the dry wipe reservoir 317, the cap 710, and the spit capture tray 307, it is contemplated that in embodiments, additional pumps may be used to pump the cleaning fluid to the various components. For example, in embodiments a first pump may be used to pump the cleaning fluid to the wet cleaning member 310 and a second pump may be used to pump the cleaning fluid to the purge wipe reservoir 315, the dry wipe reservoir 317, the cap 710, and the spit capture tray 307. As another example, a first pump may be used to pump the cleaning fluid to the wet cleaning member 310, a second pump may be used to pump the cleaning fluid to the purge wipe reservoir 315, a third pump may be used to pump the cleaning fluid to the dry wipe reservoir 317, a fourth pump may be used to pump the cleaning fluid to the spit capture tray 307, and a fifth pump may be used to pump the cleaning fluid to the cap 710. Other configurations are possible and contemplated.

As the cleaning fluid is pumped into each of the purge wipe reservoir 315, the wet cleaning member 310, the dry wipe reservoir 317, the cap 710, and the spit capture tray 307, the volume of the cleaning fluid accumulates to a fluid level within the corresponding cleaning station component. The volume of cleaning fluid is used to supply cleaning fluid to the wet cleaning member 310, the spit capture tray 307, and the cap 710 or sponge 702, as described hereinabove, and to supply cleaning fluid to the dry wipe reservoir 317 and purge wipe reservoir 315 for cleaning the dry wipe member 312 and purge wipe member 313, respectively, between uses. In embodiments, the cleaning fluid inlets (e.g., inlet ports 520, cleaning fluid inlets 416, and fluid inlets 309) can be left open to constantly feed cleaning fluid to the dry wipe reservoir 317, the wet cleaning member 310, the purge wipe reservoir 315, and the spit capture tray 307 when the machine is in operation, each of which is then overflowed into the cleaning station vessel 314.

The cleaning station vessel 314 includes a main cleaning vessel drain 320 that is in fluid communication with the cleaning fluid reservoir 816 through a filter 818. The main cleaning vessel drain 320, which is also depicted in FIGS. 4C and 4D, is positioned within the cleaning station vessel 314 enable continual removal of cleaning fluid from the cleaning station vessel 314. Accordingly, when the volume of cleaning fluid overflows from the dry wipe reservoir 317, the wet cleaning member 310, the purge wipe reservoir 315, and/or the spit capture tray 307, the cleaning fluid is caught by the cleaning station vessel 314 and is drained from the cleaning station vessel 314 via the main cleaning vessel drain 320 and returned to the cleaning fluid reservoir 816. In one or more embodiments, the main cleaning vessel drain 320 may be an active drain coupled to a pump, or may be a passive drain, which allows the cleaning fluid to pass out of the cleaning station vessel 314 without the use of a pump or other active mechanism.

In the embodiment shown in FIG. 9, the cleaning station vessel 314 further includes an overflow drain 323 that is in fluid communication with the overflow vessel 318. The overflow drain 323 can be a passive drain that is opened allow at least a portion of the cleaning fluid that is in the cleaning station vessel 314 to be flow from the cleaning station vessel 314 to the overflow vessel 318, such as in the event that the main cleaning vessel drain 320 becomes clogged.

The overflow vessel 318 further includes at least one overflow vessel drain 322 that is in fluid communication with the waste reservoir 814. In one or more embodiments, the overflow vessel drain 322 may be an active drain coupled to a pump (not shown), or may be a passive drain, which allows the cleaning fluid to pass out of the overflow vessel 318 without the use of a pump or other active mechanism. In embodiments, the overflow vessel 318 is coupled to the filter 818 and the cleaning fluid reservoir 816 and the waste reservoir 814 through a valve 813, although other pathways are contemplated. Valve 813 can be, for example, a pinch valve, a three-way valve, or a four-way valve, although other types of valves are contemplated. It is further contemplated that the overflow vessel drain 322 can be fluidly coupled to another part of the main circulation path instead of being fluidly coupled to the filter 818 and the cleaning fluid reservoir 816.

In embodiments including the valve 813, cleaning fluid flowing from the overflow vessel 318 flows through the overflow vessel drain 322. Cleaning fluid in the overflow vessel 318 is evaluated and, if verified that the cleaning fluid in the overflow vessel 318 is still usable, the cleaning fluid is returned to the cleaning fluid reservoir 816. If, however, the cleaning fluid in the overflow vessel 318 is not still suitable for use (e.g., it contains too many contaminants or does not otherwise meet specifications for use), the cleaning fluid is sent to the waste reservoir 814. In embodiments including the valve 813, the valve 813 can be controlled by a computing device, such as control system 200 that is configured to verify the suitability of the cleaning fluid for use and send a signal to the valve 813 to direct the cleaning fluid to the cleaning fluid reservoir 816 or the waste reservoir 814.

In various embodiments, one or more additional components (not shown in FIG. 9) may be included in the fluid management system 900 as part of one or both of the binder material pathway or the cleaning fluid pathway. For example, level sensors, flow sensors, cameras, heaters, cooling units, temperature sensors, pumps, filters, valves, or the like may be included in the fluid management pathways to enable monitoring, control, and adjustment of the fluids in the pathways. Such additional components may be included in any of a variety of locations within the fluid management system 900 and may be communicatively coupled to the control system 200. For example, in embodiments, the cleaning fluid path includes a heater to heat the cleaning fluid prior to it entering the cleaning station vessel 314. When included, the heater may be positioned at any of a number of points along the cleaning fluid path, such as between the pump 820 and the cleaning station vessel 314, or within the cleaning fluid reservoir 816.

As another example, in embodiments a three-way or four-way valve may be positioned within the main cleaning vessel drain 320 and the cleaning fluid reservoir 816 to redirect a predetermined amount of the cleaning fluid to the waste reservoir 814. Accordingly, in embodiments, the three-way or four-way valve may replace or replicate the functionality of the main cleaning vessel drain 320. Moreover, it is contemplated that one or more on/off valves (e.g., pinch valves) may be used in place of or in addition to the three- or four-way valves described herein.

In embodiments, one or more of the pumps described herein, including but not limited to pump 808 and pump 820, are capable of moving ferrous metals as well as other types of metals. Moreover, in embodiments, one or more of the pumps described herein may include a tunable flow rate, such as through flow regulators, which enable the flow rate to be tuned, such as to enable cleaning fluid to be provided to the wet wipe member at a first flow rate and to the inlet of the cleaning station vessel at a second flow rate.

Having described a fluid management system 900 for use in providing binder material and cleaning fluid to various components of the additive manufacturing apparatus 100, and specifically, the cleaning station 110, the binder material and cleaning fluid will now be described in detail.

Control System

Referring now to FIG. 3, FIG. 3 schematically depicts a control system 200 for controlling the components of the cleaning station and the binder and the cleaning fluid pathways. The control system 200 is communicatively coupled to at least the print head, the pump 808 and the pump 820. In embodiments, the control system 200 may additionally be communicatively coupled to at least one additional sensor, such as a sensor for monitoring one or more physical properties of the cleaning fluid, as described in greater detail above, the motors 506 coupled to the dry wipe member 312 and the purge wipe member 313, and the actuator 706 coupled to the sponge support 704 or cap 710. In the embodiments described herein, the control system 200 comprises a processor 202 communicatively coupled to a memory 204. The processor 202 may include any processing component(s), such as a central processing unit or the like, configured to receive and execute computer readable and executable instructions stored in, for example, the memory 204. In the embodiments described herein, the processor 202 of the control system 200 is configured to provide control signals to (and thereby actuate) the print head 150, the pump 808, and the pump 820.

In embodiments, the control system 200 may be configured to receive signals from one or more sensors of the fluid management system and, based on these signals, actuate one or more of the print head 150, the pump 808, the pump 820, or other valves, pumps, and drains that may be included in the fluid management system. In some embodiments, the control system 200 may be configured to receive signals from one or more additional sensors in the additive manufacturing apparatus 100 and, based on these signals, actuate one or more of the motors 506 coupled to the dry wipe member 312 and the purge wipe member 313 to rotate the components of the cleaning station 110 for use.

In various embodiments, the control system 200 is configured to receive signals from and send signals to one or more components described herein. Accordingly, the control system 200, in embodiments, can enable one or more of the functions described herein, including, without limitation, movement of any or all of the components of the cleaning station (e.g., the wet wipe member, the dry wipe member, the purge wipe member, and the capping section), adjustment of one more components described herein, monitoring the status of binder material and/or cleaning fluid described herein, monitoring performance of the additive manufacturing apparatus or any component thereof, measurements of various components, opening and closing of ports and valves, and the like. In embodiments, the control system 200 is configured to control motion of the recoat head, the print head, and other components of the additive manufacturing device described herein.

Moreover, it is contemplated that, although control system 200 is shown in FIG. 3 as being a single computing device, the control system 200 may be a distributed system that includes multiple computing devices interconnected to perform the functions herein.

In the embodiments described herein, the computer readable and executable instructions for controlling the additive manufacturing apparatus 100, and particularly, the cleaning station 110 and the fluid management system, are stored in the memory 204 of the control system 200. The memory 204 is a non-transitory computer readable memory. The memory 204 may be configured as, for example and without limitation, volatile and/or nonvolatile memory and, as such, may include random access memory (including SRAM, DRAM, and/or other types of random access memory), flash memory, registers, compact discs (CD), digital versatile discs (DVD), and/or other types of storage components.

Further aspects of the invention are provided by the subject matter of the following clauses:

1. A cleaning station comprising: a first wipe member rotatable about a first rotational axis comprising one or more wiper blades; a first wipe reservoir containing a volume of cleaning fluid therein, the first wipe reservoir located adjacent to the first wipe member such that as the first wipe member is rotated about the first rotational axis, the one or more wiper blades are rotated into and out of the volume of cleaning fluid in the first wipe reservoir; a second wipe member rotatable about a second rotational axis parallel to the first rotational axis, the second wipe member comprising one or more wiper blades; a second wipe reservoir containing a volume of cleaning fluid therein, the second wipe reservoir located adjacent to the second wipe member such that as the second wipe member is rotated about the second rotational axis, the one or more wiper blades are rotated into and out of the volume of cleaning fluid in the second wipe reservoir; and a wet cleaning member comprising a fluid channel containing a volume of cleaning fluid therein, wherein the wet cleaning member is positioned between the first wipe member and the second wipe member along a longitudinal axis extending substantially perpendicular to the first rotatable axis and the second rotatable axis.

2. A cleaning station comprising the cleaning station of any preceding clause, further comprising a spit capture tray containing a volume of cleaning fluid therein.
3. A cleaning station comprising the cleaning station of any preceding clause, wherein the spit capture tray comprises a first side wall and a second side wall, and wherein a height of the first side wall is less than an height of the second side wall.
4. A cleaning station comprising the cleaning station of any preceding clause, further comprising a cover operable to create or maintain a non-curing environment around a print head.
5. A cleaning station comprising the cleaning station of any preceding clause further comprising: a cleaning station vessel positioned below the first wipe member, the second wipe member, and the wet cleaning member to receive cleaning fluid therefrom.
6. A cleaning station comprising the cleaning station of any preceding clause, wherein the cleaning station vessel comprises a bottom surface that is angled with respect to a horizontal plane and with respect to a vertical plane.
7. A cleaning station comprising the cleaning station of any preceding clause, the cleaning station vessel comprising a main cleaning vessel drain positioned at a lowest vertical point of the cleaning station vessel.
8. A cleaning station comprising the cleaning station of any preceding clause, further comprising an overflow vessel at least partially surrounding the cleaning station vessel.
9. A cleaning station comprising the cleaning station of any preceding clause, wherein at least one of the first wipe reservoir and the second wipe reservoir comprise a brush or a wiper blade positioned therein to mechanically clean the corresponding first or second wipe member.
10. A cleaning station comprising the cleaning station of any preceding clause, further comprising: a first motor coupled to the first wipe member to cause the first wipe member to rotate about the first rotational axis; and a second motor coupled to the second wipe member to cause the second wipe member to rotate about the second rotational axis.
11. A cleaning station comprising the cleaning station of any preceding clause, further comprising: a motor coupled to the first wipe member and the second wipe member to cause the first wipe member to rotate about the first rotational axis and to cause the second wipe member to rotate about the second rotational axis.
12. A cleaning station comprising the cleaning station of any preceding clause, wherein the wet cleaning member is stationary with respect to the first wipe member and the second wipe member.
13. A cleaning station comprising the cleaning station of any preceding clause, further comprising a purge bin, wherein the first wipe member rotates in a direction effective to direct material from the one or more wiper blades of the first wipe member into the purge bin.
14. A cleaning station comprising the cleaning station of any preceding clause, further comprising a wiper blade cleaning member between the purge bin and the first wipe reservoir.
15. A method of cleaning a print head comprising: rotating a first wipe member and a second wipe member into a contact position in which one or more wiper blades extends upwards vertically from each of the first wipe member and the second wipe member; flowing cleaning fluid to a cleaning member positioned between the first wipe member and the second wipe member; passing the print head over the first wipe member, thereby enabling the first wipe member to remove contaminants from the print head; passing the print head over the cleaning member and the second wipe member, thereby enabling the second wipe member to remove cleaning fluid from the print head; and rotating the first wipe member and the second wipe member into non-contact position in which one or more wiper blades are not extending from the first wipe member or the second wipe member in a substantially vertical direction.
16. A method comprising the method of any preceding clause, further comprising: applying backpressure to the print head prior to passing the print head over the first wipe member.
17. A method comprising the method of any preceding clause, further comprising: passing the print head over a spit capture tray adjacent to the second cleaning member; and applying backpressure to the print head during passing of the print head over spit capture tray, thereby equilibrating the print head for printing.
18. A method comprising the method of any preceding clause, further comprising: providing a flow of cleaning fluid to the spit capture tray.
19. A method comprising the method of any preceding clause, further comprising: rotating the first wipe member and the second wipe member to contact the one or more wiper blades with cleaning fluid contained in a wipe reservoir positioned below the first wipe member and the second wipe member.
20. A method comprising the method of any preceding clause, further comprising: collecting cleaning fluid from the wipe reservoir and the cleaning member in a cleaning station vessel.
21. A method comprising the method of any preceding clause, further comprising: continuously removing the cleaning fluid from the cleaning station vessel.
22. A method comprising the method of any preceding clause, wherein the print head comprises a deflector plate that maintains contact between the print head 150 and the one or more wiper blades of the second wipe member.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

The invention claimed is:
1. A method of cleaning a print head, the method comprising:
rotating a first wipe member and a second wipe member into a contact position in which one or more wiper blades extends upwards vertically from each of the first wipe member and the second wipe member;
flowing cleaning fluid to a cleaning member positioned between the first wipe member and the second wipe member;
passing the print head over the first wipe member, thereby enabling the first wipe member to remove contaminants from the print head;

passing the print head over the cleaning member and the second wipe member, thereby enabling the second wipe member to remove cleaning fluid from the print head; and rotating the first wipe member and the second wipe member into non-contact position in which one or more wiper blades are not extending from the first wipe member or the second wipe member in a substantially vertical direction.

2. The method of claim 1, further comprising:
applying backpressure to the print head prior to passing the print head over the first wipe member.

3. The method of claim 1, further comprising:
passing the print head over a spit capture tray adjacent to the second wipe member; and
applying backpressure to the print head during passing of the print head over the spit capture tray, thereby equilibrating the print head for printing.

4. The method of claim 3, further comprising:
providing a flow of cleaning fluid to the spit capture tray.

5. The method of claim 3, wherein the spit capture tray comprises a first side wall and a second side wall, and wherein a height of the first side wall is less than a height of the second side wall.

6. The method of claim 1, further comprising:
rotating the first wipe member and the second wipe member to contact the one or more wiper blades with cleaning fluid contained in a wipe reservoir positioned below the first wipe member and the second wipe member.

7. The method of claim 6, further comprising:
collecting cleaning fluid from the wipe reservoir in a cleaning station vessel.

8. The method of claim 7, wherein the cleaning station vessel is positioned below the first wipe member, the second wipe member to receive cleaning fluid therefrom.

9. The method of claim 7, further comprising:
continuously removing the cleaning fluid from the cleaning station vessel.

10. The method of claim 7, wherein the cleaning station vessel comprises a bottom surface that is angled with respect to a horizontal plane and with respect to a vertical plane and a main cleaning vessel drain positioned at a lowest vertical point of the cleaning station vessel.

11. The method of claim 7, wherein an overflow vessel at least partially surrounds the cleaning station vessel.

12. The method of claim 7, wherein the wet cleaning member is stationary with respect to the first wipe member and the second wipe member.

13. The method of claim 6, wherein the wipe reservoir comprises a brush or a wiper blade positioned therein to mechanically clean the corresponding first or second wipe member.

14. The method of claim 1, wherein the print head comprises a deflector plate that maintains contact between the print head and the one or more wiper blades of the second wipe member.

15. The method of claim 1, wherein a motor is coupled to the first wipe member and the second wipe member to cause the first wipe member and the second wipe member to rotate.

* * * * *